US007508539B2

(12) United States Patent
Tagawa

(10) Patent No.: US 7,508,539 B2
(45) Date of Patent: Mar. 24, 2009

(54) IMAGE FORMING DEVICE, LAYOUTER, AND RENDERER

(75) Inventor: Norio Tagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 855 days.

(21) Appl. No.: 10/461,442

(22) Filed: Jun. 16, 2003

(65) Prior Publication Data

US 2003/0231346 A1    Dec. 18, 2003

(30) Foreign Application Priority Data

Jun. 14, 2002   (JP)  ............................. 2002-174089

(51) Int. Cl.
  *G06K 15/00*    (2006.01)
(52) U.S. Cl. ...................... 358/1.18; 358/1.1; 358/1.16; 358/1.15; 382/176; 715/204
(58) Field of Classification Search ................ 358/1.15, 358/1.1, 1.11–1.18, 400, 450, 452, 296, 405; 714/752; 709/203; 715/205
See application file for complete search history.

(56) References Cited

U.S. PATENT DOCUMENTS 5,159,465 A * 10/1992 Maemura et al. ............ 358/405

| | | | |
|---|---|---|---|
| 6,623,190 B1 * | 9/2003 | Lutz | ............................. 400/76 |
| 7,050,192 B2 * | 5/2006 | Shima | ........................ 358/1.18 |
| 2001/0042234 A1 * | 11/2001 | Sasaki et al. | ................. 714/752 |
| 2002/0078149 A1 * | 6/2002 | Chang et al. | ................. 709/203 |
| 2003/0002072 A1 * | 1/2003 | Berkema et al. | ........... 358/1.15 |
| 2003/0007168 A1 * | 1/2003 | Takahashi | .................. 358/1.15 |

FOREIGN PATENT DOCUMENTS

JP   A 2002-91726   3/2002
JP   A 2004-17418   1/2004

* cited by examiner

*Primary Examiner*—King Y Poon
*Assistant Examiner*—Lennin R Rodriguez
(74) *Attorney, Agent, or Firm*—Oliff & Berridge, PLC

(57) ABSTRACT

An image forming device includes a layouter for generating layout data for a document file; a renderer for generating rendering data for the document file; a data control section connected to the layouter and the renderer; and a print section. The data control section includes a detector for detecting location information on image data when the data control section receives a request for dimensions information on the image data from the layouter and when the data control section receives a request for the image data from the renderer; an acquirer for acquiring the requested image data and the dimensions information on the image data on the basis of the location information detected by the detector; and an output controller for controlling so that the document file is output to the layouter and the image data and the dimensions information on the image data acquired by the acquirer are outputted to the renderer and the layouter, respectively.

14 Claims, 20 Drawing Sheets

FONT

TEXT

IMAGE

IMAGE FORMING DEVICE, LAYOUTER, AND RENDERER

BACKGROUND OF THE INVENTION

1. Field of the Invention

The present invention relates to an image forming device for printing text data and image data, and also to a layouter and a renderer connected to the image forming device.

2. Description of Related Art

When a printer prints text data and image data on a print medium, there are two cases. In one case, a terminal device such as a client computer transmits, to the printer, data containing, together with an XHTML (Extensible Hyper Text Markup Language) file including text data, image data related to the XHTML file (hereinafter referred to as multiplexed data). In the other case, the terminal device transmits, to the printer, only an XHTML file (hereinafter referred to as plain XHTML) and image data is downloaded to the printer. In the latter case, for downloading the image data, an URL (Uniform Resource Locator) is used, which is location information indicating the storage location of the image data on a network such as the Internet.

A printing operation of a printer that can cope with both cases will be described with reference to FIGS. 19 and 20. Multiplexed data is divided into data blocks each called chunk for receiving therein text data or image data. Multiplexed data received by the printer is in a state that each of image data and an XHTML file is received in one or more chunks. A chunk having received therein image data may be before or after a chunk including a tag <img> related to the image data.

First, in Step 801, it is judged whether or not data input of an XHTML file for printing has ended, that is, whether or not data read of the entire XHTML file has ended. When the data read is judged not to have ended, that is, NO in S801, the flow advances to Step 802. When the data read is judged to have ended, that is, YES in S801, the flow advances to Step 815.

In Step 802, it is judged whether or not data newly read includes therein a tag <img> concerning paste of image data. The tag <img> described therein the title and URL of image data to be displayed or printed together with text data when contents of the XHTML file are displayed or printed. When the data newly read is judged to include therein a tag <img>, that is, YES in S802, the flow advances to Step 804. When the data newly read is judged to include therein no tag <img>, that is, NO in S802, the flow advances to Step 803. In Step 803, other kinds of data processing, for example, layout processing for text data included in the XHTML file and read processing of XHTML data from a buffer, are performed. The flow then advances to Step 813.

In Step 804, it is judged whether data received from a client computer is multiplexed data or plain XHTML. This judgment is made based on input format information separately sent from the client computer. When the data is judged to be plain XHTML, that is, "Plain" in S804, the flow advances to Step 805. When the data is judged to be multiplexed data, that is, "Multiplexed" in S804, the flow advances to Step 806.

In Step 805, the printer connects, using Hypertext Transfer Protocol, to a server on an external network related to the URL described in the tag <img> of the XHTML file constituting the plain XHTML.

In Step 806, it is judged whether or not image data having the same URL as the URL described in the newly read data exists in a buffer. When it is concluded that no image data having the same URL exists, that is, NO in S806, the flow advances to Step 807. In Step 807, a chunk constituting the multiplexed data is read from the buffer. The flow then returns to Step 806. On the other hand, when it is concluded that image data having the same URL exists, that is, YES in S806, the flow advances to Step 808.

In Step 808, the header of the image data existing on the server to which the printer connected in Step 805 in case of plain XHTML, or the header of the image data stored in the buffer in case of multiplexed data, is read, thereby acquiring dimensions information on the image data recorded in the header. Subsequently in Step 809, layout processing for the image data whose dimensions information has been acquired in Step 808 is performed on the basis of the acquired dimensions information.

In Step 810, like in Step 804, it is judged whether the data received from the client is multiplexed data or plain XHTML. When the data is judged to be multiplexed data, that is, "Multiplexed" in S810, the flow advances to Step 811. When the data is judged to be plain XHTML, that is, "Plain" in S810, the flow advances to Step 812.

In Step 811, the image data whose dimensions information has been read in Step 808 is written in the buffer. The image data written in the buffer is used in the later process as will be described with reference to FIG. 20. On the other hand, in step 812, the printer is disconnected from the server to which the printer has been connected in Step 805. The flow then advances to step 813.

In Step 813, it is judged whether or not layout processing for printing one page is performed. When layout processing for printing one page is judged to be performed, that is, YES in S813, the flow advances to step 814. In Step 814, layout data as intermediate data is output to perform printing one page. The flow then returns to Step 801. On the other hand, when layout processing for printing one page is judged not to be performed, that is, No in S813, the flow skips Step 814 and returns to Step 801.

In Step 815, it is judged whether or not unoutput layout data exists. When it is concluded that unoutput layout data exists, that is, YES in S815, the flow advances to Step 816. In Step 816, the unoutput layout data is output to perform printing one page. Layout processing is then ended. On the other hand, it is concluded that no unoutput layout data exists, that is, NO in S815, the flow skips Step 816 and layout processing is ended.

Next, details of processing for printing one page, i.e., rendering processing, in Step 814 or 816 in FIG. 19 will be described with reference to FIG. 20. In Step 901, it is judged whether or not inputting layout data of one page output in Step 814 or 816 has ended, that is, whether or not data read of the entire data related to the output layout data has ended. When the data read is judged not to have ended, that is, NO in S901, the flow advances to Step 902, When the data read is judged to have ended, that is YES in S901, the flow advances to Step 915.

In Step 902, it is judged whether or not data newly read includes therein a tag <img> concerning paste of image data. When the data newly read is judged to include therein a tag <img>, that is, YES in S902, the flow advances to Step 904. When the data newly read is judged to include therein no tag <img>, that is, NO in S902, the flow advances to Step 903. In Step 903, other kinds of data processing, for example, processing of rendering text data in accordance with a layout and data read processing from the buffer, are performed The flow then returns to Step 901.

In Step 904, it is judged whether data received from the client computer is multiplexed data or plain XHTML. When the data is judged to be plain XHTML, that is, "Plain" in S904, the flow advances to Step 905. When the data is judged to be multiplexed data, that is, "Multiplexed" in S904, the flow advances to Step 906.

In Step 905, the printer connects, using Hypertext Transfer Protocol, to a server on an external network related to the URL described in the tag <img> of the XHTML file constituting the plain XHTML. The flow then advances to Step 910.

In Step 906, it is judged whether or not the buffer stores therein multiplexed data. When the buffer is judged to store therein multiplexed data, that is, YES in S906, the flow advances to Step 907. In Step 907, the multiplexed data on the buffer is decoded. More specifically, image data in, e.g., JPEG format, is taken out from a chunk of the multiplexed data. The taken-out image data is stored in another area of the buffer. On the other hand, when the buffer is judged to store therein no multiplexed data, that is, NO in S906, the flow skips Step 907 and advances to Step 908.

In Step 908, it is judged whether or not image data having the same URL as the URL described in the newly read chunk exists in the buffer. When it is concluded that no image data having the same URL exists, that is, NO in S908, the flow advances to Step 909. In Step 909, the next chunk is read from the buffer. The flow then returns to Step 908. On the other hand, when it is concluded that image data having the same URL exists, that is, YES in S908, the flow advances to Step 910.

In Step 910, the image data existing on the server to which the printer connected in Step 905 in case of plain XHTML, or the image data stored in the buffer in case of multiplexed data, is read. The read image data is decoded to be converted into bitmap data. In Step 911, the bitmap data, corresponding to one image, decoded in Step 910, is output to the buffer in accordance with layout data.

In Step 912, it is again judged whether the data received from the client is multiplexed data or plain XHTML. When the s data is judged to be plain XHTML, that is, "Plain" in S912, the flow advances to Step 913. When the data is judged to be multiplexed data, that is, "Multiplexed" in S912, the flow advances to Step 914.

In Step 913, the printer is disconnected from the server to which the printer has been connected in step 905. The flow then returns to Step 901. On the other hand, in Step 914, the multiplexed data is deleted from the buffer, that is, the contents buffer is released. The flow then returns to Step 901.

In Step 915 executed when the layout data input is judged to be completed, rendering data, which is obtained by performing rendering of text data or image data for printing one page and includes therein data of one or more images, is output to a print engine. Rendering processing is then ended.

In the above-described printer that can cope with both of multiplexed data and plain XHTML, it must be judged in either of layout processing and rendering processing whether the data being received from the client is multiplexed data or plain XHTML. Besides, in accordance with the judgment results, image data must be acquired from one of the buffer and the server on the external network. Therefore, if there is a change in format of the data being received from the client, which data may be referred to as "input data" in the below description, or there is an added format, both of layout processing and rendering processing must be changed accordingly. Rapid solution of this problem is desired from the viewpoint of shortening the development period of printer and decreasing the development cost.

SUMMARY OF THE INVENTION

According to an aspect of the present invention, an image forming device comprises a layouter for generating layout data for a document file on the basis of text data included in the document tile and dimensions information on image date related to the document file; a renderer for generating rendering data for the document file on the basis of the image data related to the document file and the layout data acquired from the layouter; a data control section connected to the layouter and the renderer; and a print section for printing on the basis of the rendering data received from the renderer. The data control section comprises a detector for detecting location information on image data when the data control section receives a request for dimensions information on the image data from the layouter and when the data control section receives a request for the image data from the renderer; an acquirer for acquiring the requested image data and the dimensions information on the image data on the basis of the location information detected by the detector; and an output controller for controlling so that the document file is output to the layouter and the image data and the dimensions information on the image data acquired by the acquirer are output to the renderer and the layouter, respectively.

According to another aspect of the present invention, an image forming device comprises a data control section connected to a layouter for generating layout data for a document file and a renderer for generating rendering data for the document file, and a print section for printing on the basis of the rendering data. The data control section comprises a detector for detecting location information on image data when the data control section receives a request for dimensions information on the image data from the layouter and when the data control section receives a request for the image data from the renderer; an acquirer for acquiring the requested image data and the dimensions information on the image data on the basis of the location information detected by the detector; and an output controller for controlling so that the document file is output to the layouter, the image data and the dimensions information on the image data acquired by the acquirer are output to the renderer and the layouter, respectively, and the rendering data is output from the renderer to the print section.

According to the invention, the layouter for layout processing and the renderer for rendering processing only exchange data with the data control section, and the kind of data exchanged with the data control section is the same even in case of which of multiplexed data and plain data the image forming device receives. Therefore, if only processing in the data control section is changed, it can cope with a change in or an addition to the data format to be sent to the image forming device. Processing in the layouter and renderer need not be changed. Thus, an image forming device can be developed in a short development period at a relatively low development cost.

According to still another aspect of the present invention, a layouter is connected to a renderer for generating rendering data for a document file and an image forming device for printing on the basis of the rendering data made by the renderer. The layouter comprises a request signal generator for generating a request signal for requesting the image forming device to send dimensions information on image data related to a document file received from the image forming device; a layout section for generating layout data for the document file on the basis of the dimensions information on the image data received from the image forming device as a response to the request signal, and the document file received from the image forming device; and an output section for outputting the layout data generated by the layout section to the renderer.

According to the invention, the layouter only exchanges data with the renderer and the image forming device, and the kind of data exchanged with the renderer and the image forming device is the same even in case of which of multiplexed data and plain data the image forming device receives. Therefore, there is an advantage that the construction of the layouter need not be changed even if there is a change in or an addition to the data format to be sent to the image forming device.

According to still another aspect of the present invention, a renderer is connected to a layouter for generating layout data for a document file and an image forming device for printing on the basis of rendering data. The renderer comprises a request signal generator for generating a request signal for requesting the image forming device to send image data related to the layout data received from the layouter; a rendering section for generating rendering data for the document file on the basis of the image data received from the image forming device as a response to the request signal, and the layout data received from the layouter; and an output section for outputting the rendering data generated by the rendering section to the image forming device.

According to the invention, the renderer only exchanges data with the layouter and the image forming device, and the kind of data exchanged with the layouter and the image forming device is the same even in case of which of multiplexed data and plain data the image forming device receives. Therefore, there is an advantage that the construction of the renderer need not be changed even if there is a change in or an addition to the data format to be sent to the image forming device.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
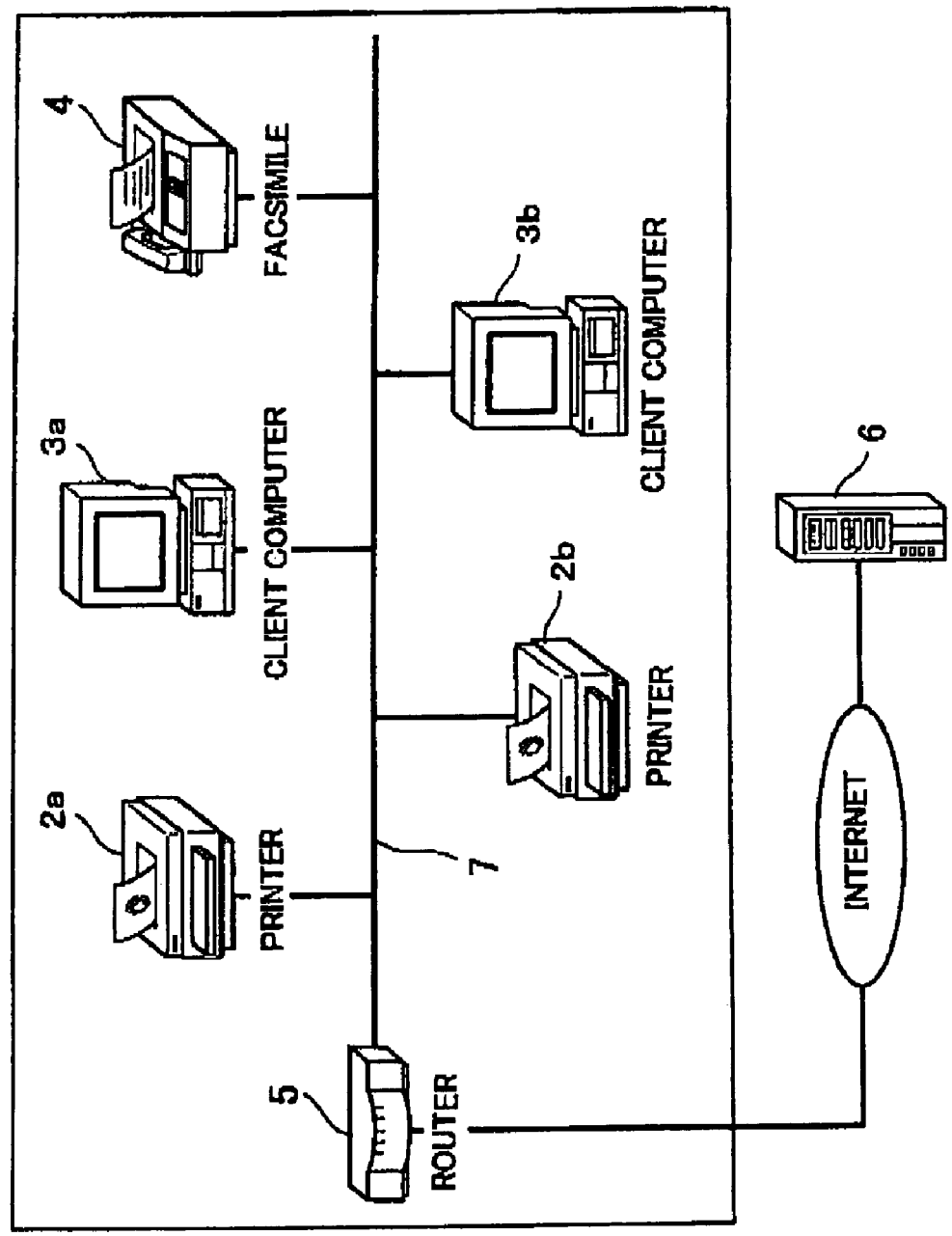
FIG. 1 illustrates a network system including printers according to a first embodiment of the present invention.

First, a network system including printers according to a first embodiment of the present invention will be described with reference to FIGS. 1 and 2. The network system 1 of FIG. 1 includes two printers 2a and 2b, two client computers 3a and 3b, one facsimile 4, and one router 5. These devices are connected to one another through a LAN (Local Area Network) cable 7. Each device in the network system 1 can transmit data to and receive data from a web server 6 on the Internet through the router 5.

Figure 2:
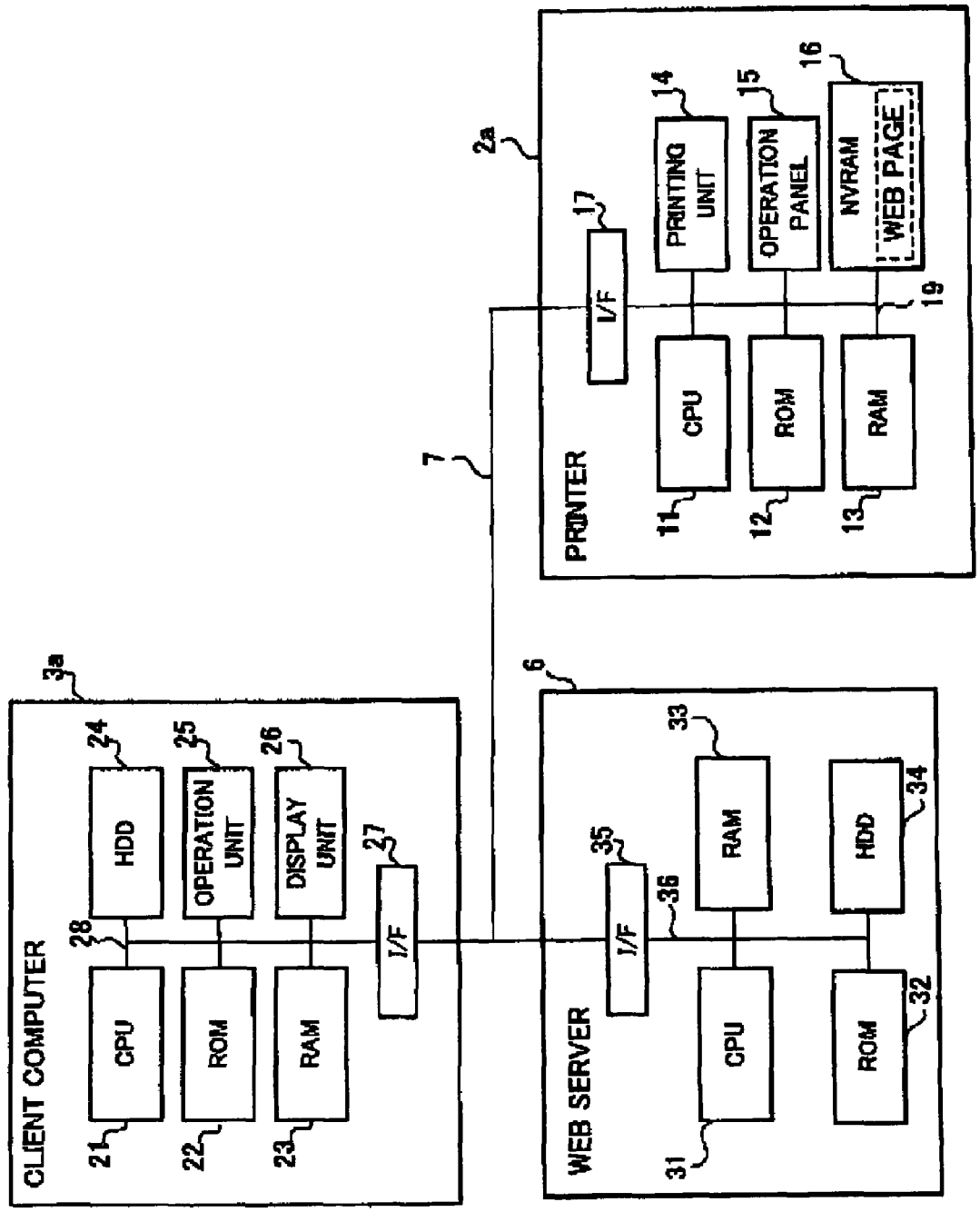
FIG. 2 is a block diagram of part of the network system of FIG. 1.

FIG. 2 illustrates only the server 6, a client 3a, and a printer 2a of the devices illustrated in FIG. 1. This is for simplifying the drawing and because an example wherein input data from the client 3a is transmitted to the printer 2a will be described below. In practice, however, the network system 1 includes therein other devices such as the client 3b and the printer 2b as illustrated in FIG. 1. Thus, there may be a case wherein input data from the client 3b is transmitted to the printer 2a.

Referring to FIG. 2, the web server 6 includes therein a CPU (Central Processing Unit) 31, a ROM (Read Only Memory) 32, a RAM (Random Access Memory) 33, a HDD (Hard Disk Drive) 34, and an interface 35. These devices are connected to one another through a system bus 36.

The ROM 32 works as part of a main memory of the web server 6 and stores therein various programs such as a system program. Like the ROM 32, the RAM 33 also works as part of the main memory of the web server 6. In the RAM 33 provided is a working area for storing working data temporarily necessary and intermediate files for data processing.

The HDD 34 stores therein an OS (operating System) of the web server 6, various application programs, and web pages each including an XHTML file including text data, and image data related to the XHTML file. Location information on each of XHTML files and image data is described as a URL. The URL of image data is described in a tag <img> in the related XHTML file.

The CPU 31 reads out a program from the ROM 32 or HDD 34 and stores it in the RAM 33 to execute the stored program in order. The interface 35 connects the web server 6 to the Internet so that the web server 6 can communicate with a device on the Internet.

Referring to FIG. 2, the client 3a includes therein a CPU 21, a ROM 22, a RAM 23, a HDD 24, an operation unit 25, a display unit 26, and an interface 27. These devices are connected to one another through a system bus 28.

The ROM 22 works as part of a main memory of the client 3a and stores therein various programs such as a system program. Like the ROM 22, the RAM 23 also works as part of the main memory of the client 3a. In the RAM 23 provided is a working area for storing intermediate files for data processing.

The HDD 24 stores therein an OS of the client 3a and various application programs such as a web browser. The CPU 21 reads out a program from the ROM 22 or HDD 24 and stores it in the RAM 23 to execute the stored program in order.

The operation unit 25 is a data input device for a user. The operation unit 25 includes a keyboard on which a predetermined number of input keys are arranged, and a pointing device such as a mouse. The display unit 26 is for displaying text data and image data. The display unit 26 includes a display device such as a liquid crystal display or a plasma display. The interface 27 connects the client 3a to a LAN so that the client 3a can communicate with each device on the LAN such as the router 5 (FIG. 1) and the printer 2a.

In this embodiment, on the basis of an operation by the user, the client 3a downloads therein a desired web page from the web server 6 according to Hypertext Transfer Protocol. The downloaded web page is displayed on the display unit 26 by a web browser. At this time, if the user clicks a print button in the web browser with a mouse and selects the printer 2a, one of multiplexed data containing an XHTML file and image data related to the XHTML file, and plain XHTML containing only an XHTML file, is transmitted to the printer 2a through the LAN cable 7.

Referring to FIG. 2, the printer 2a includes therein a CPU 11, a ROM 12, a RAM 13, a print engine 14, an operation panel 15, an NVRAM Nonvolatile Random Access Memory) 16, and an interface (I/F) 17. These devices are connected to one another through a system bus 19.

The ROM 12 works as part of a main memory of the printer 2a and stores therein various programs such as a system program. Like the ROM 12, the RAM 13 also works as part of the main memory of the printer 2a. In the RAM 13 provided is a working area for storing working data temporarily necessary and intermediate files for data processing.

In the RAM 13 provided is a flag storage area 13a (see FIG. 3) for storing an input format flag indicating whether data received by the printer 2a is multiplexed data or plain XHTML. In the RAM 13 further provided is a contents buffer 13b for storing multiplexed data and plain XHTML received from the client 3a. In the RAM 13 further provided is a protection flag storage area 13c for storing a protection flag indicating whether or not multiplexed data stored in the contents buffer 13b should be protected.

Figure 3:
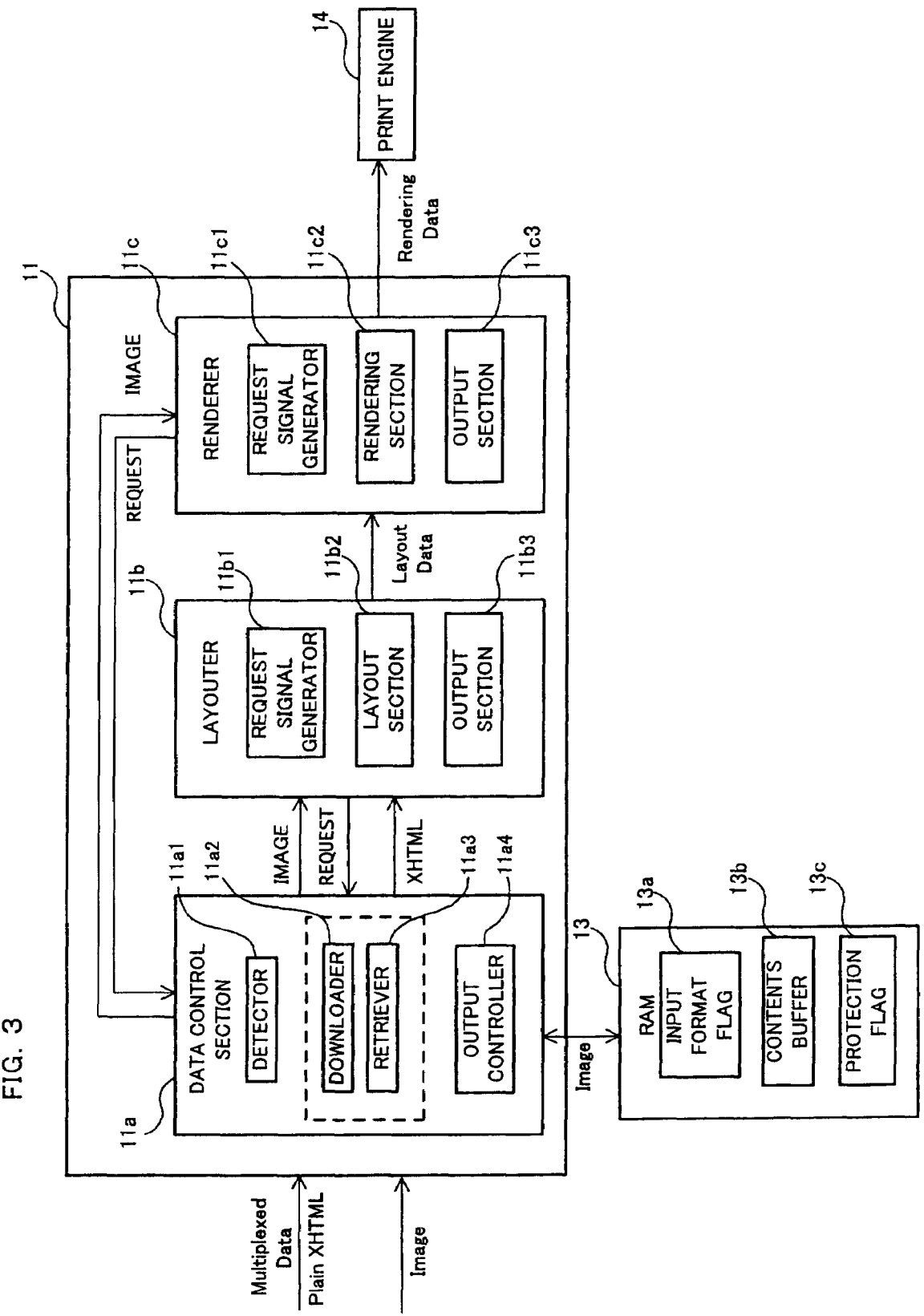
FIG. 3 is a block diagram of functions of the printer of FIG. 2.

The print engine 14 prints characters and images on a print medium in monochrome or color on the basis of rendering data supplied from a renderer 11c of the CPU 11 (see FIG. 3). The operation panel 15 includes a display device for displaying information and an input device for the user inputting data. The display device is for displaying various kinds of information, e.g., on operations of the printer 2a.

The NVRAM 16 stores therein a program causing the printer 2a to execute layout processing and rendering processing on the basis of input data received from the client 3a. In addition, the NVRALM 16 stores therein display information, e.g., on a web page, to be displayed on the display device of the operation panel 15 or on the display unit 26 of the client 3a connected through the LAN. Further, the NVRAM 16 stores therein a product serial number and so on. The interface 17 connects the printer 2a to the LAN so that the printer 2a can communicate with each device on the LAN such as the router 5 (FIG. 1) and the client 3a.

The CPU 11 reads out a program from the ROM 12 or NVRAM 16 and stores it in the RAM 13 to execute the stored program in order. In this embodiment, the CPU 11 mainly functions as a data control section 11a, a layouter 11b, and a renderer 11c, as illustrated in FIG. 3.

The layouter 11b receives an XHTML file when the printer 2a receives any of plain XHTML and multiplexed data. When the printer 2a receives plain XHTML, the layouter 11b receives the XHTML file that is the plain XHTML. When the printer 2a receives multiplexed data, the layouter 11b receives the XHTML file obtained by excluding image data from the multiplexed data. The layouter 11b includes therein a request signal generator 11b1 for generating a request signal for requesting the data control section 11a to send image data related to the XHTML file. The request signal includes therein the URL of the image data being requested, which URL is originally described in a tag <img> in the XHTML file received from the data control section 11a.

A layout section 11b2 of the layouter 11b makes a layout of text data and image data on the basis of the XHTML file received from the data control section 11a and dimensions information on the image data included in the header of the image data acquired from the data control section 11a as a response to the request signal, and thereby the layout section 11b2 generates layout data containing layout information. The generated layout data is output through an output section 11b3 to the renderer 11c in units of one print page.

The renderer 11c receives the layout data from the layouter 11b in units of one print page. The renderer 11c includes therein a request signal generator 11c1 for generating a request signal for requesting image data related to the layout data. A rendering section 11c2 of the renderer 11c performs rendering of text data and image data on the basis of the layout data received from the layouter 11b and the image data acquired from the data control section 11a as a response to the request signal, and then the rendering section 11c2 outputs rendering data containing rendering information through an output section 11c3 to the print engine 14.

The data control section 11a includes therein a detector 11a1, a downloader 11a2, a retriever 11a3, and an output controller 11a4. The downloader 11a2 and the retriever 11a3 constitute an acquirer for image data.

The output controller 11a4 judges whether input data received from the client 3a is multiplexed data or plain XHTML. When the input data is multiplexed data, the output controller 11a4 decodes the input data to take out an XHTML file and image data, respectively. The output controller 11a4 then outputs the taken-out XHTML file and image data to the contents buffer 13b. When the input data is plain XHTML, the output controller 11a4 outputs it with no change as an XHTML file to the contents buffer 13b. Further, the output controller 11a4 outputs an XHTML file in the contents buffer 13b to the layouter 11b, and outputs image data to the layouter 11b and the renderer 11c in response to requests from them.

In this embodiment, the output controller 11a4 may judge in accordance with conditions of the Internet and the LAN whether or not image data should be output to the contents buffer 13b. For example, only when the communication speed in the Internet and LAN is low or the network is jammed, the output controller 11a4 outputs the image data to the contents buffer 13b. In this measure, with ensuring high-speed access to image data, the RAM 13 is prevented from being occupied by the contents buffer 13b.

When image data is requested by the layouter 11b or renderer 11c, the detector 11a1 of the data control section 11a detects location information indicating where the requested image data exists, on the basis of an input format flag and the URL of the image data contained in the request signal. In case of multiplexed data, because the image data is stored in the contents buffer 13b as part of the multiplexed data, the detector 11a1 finds the image data in the contents buffer 13b. In case of plain XHTML, because the image data is not stored in the contents buffer 13b, the detector 11a1 finds the image data in the web server 6 (FIG. 1).

In case of multiplexed data, the retriever 11a3 of the data control section 11a retrieves image data from the contents buffer 13b on the basis of the location information detected by the detector 11a1. In case of plain XHTML, the downloader 11a2 of the data control section 11a downloads image data from the web server 6 on the basis of the location information detected by the detector 11a1. The image data thus acquired is output to the renderer 11c or layouter 11b under the control of the output controller 11a4.

In a modification, the request signal generator 11b1 of the layouter 11b may generate a request signal for requesting the data control section 11a to send only the header of image data related to an XHTML file. In either of the cases wherein a request signal generated by the request signal generator 11b1 requests only the header of image data and wherein a request signal generated by the request signal generator 11b1 requests image data, the request signal is for requesting the data control section 11a1 to send dimensions information of the image data included in the header of the image data. In either case, the downloader 11a2 and the retriever 11a3 can acquire the dimensions information of the image data, and the output controller 11a4 can output the dimensions information of the image data to the layouter 11b.

Figure 4:
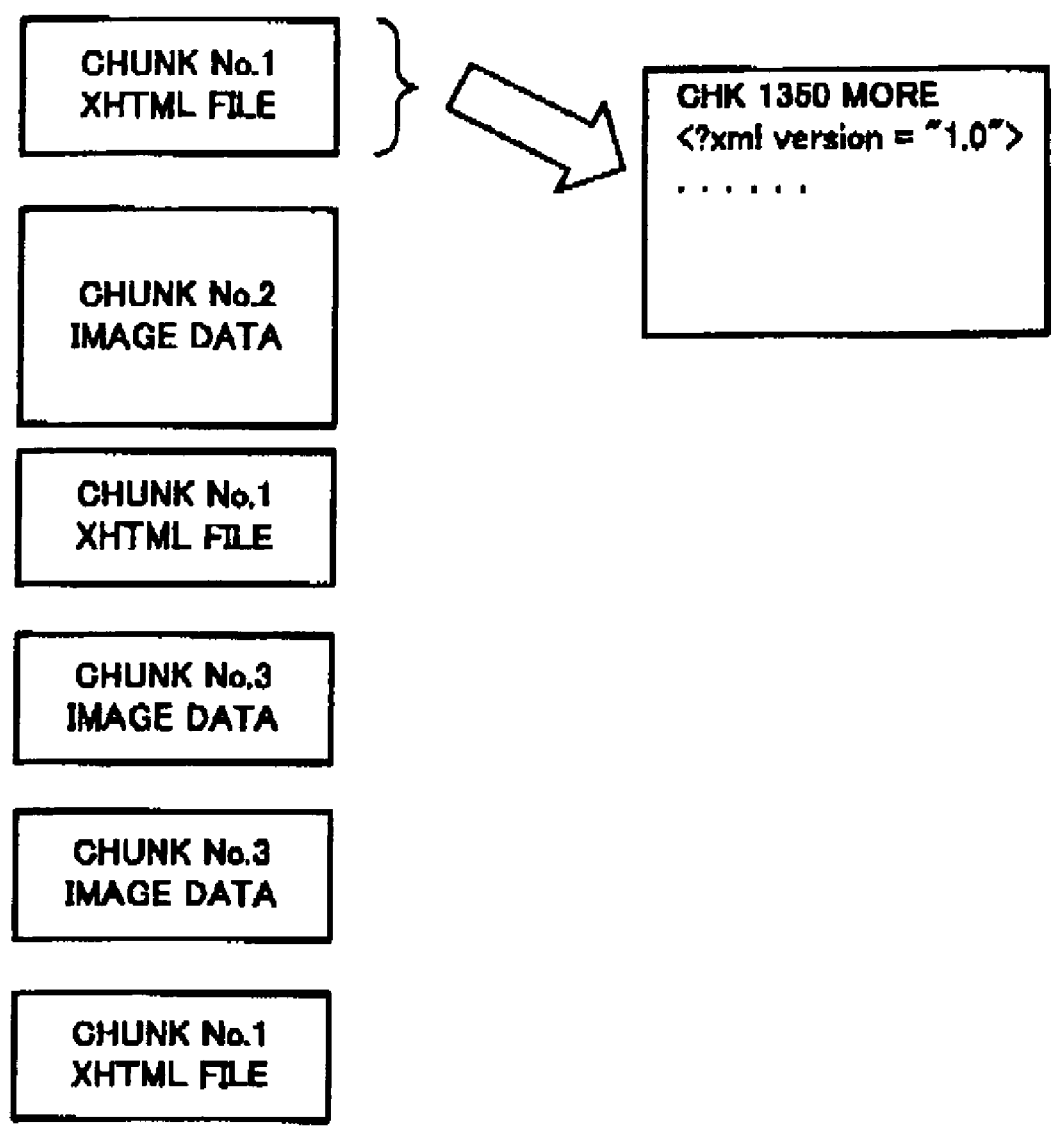
FIG. 4 illustrates multiplexed data.

Next, an example of multiplexed data sent from the client 3a to the printer 2a will be described with reference to FIG. 4, The multiplexed data of FIG. 4 is divided into six chunks. Generally in multiplexed data, chunks having the same chunk number are made by dividing one file. In the example of FIG. 4, one XHTML file is divided into three chunks and one of two image files is divided into two chunks. In this embodiment, it is predetermined that the chunks having "chunk number 1" are related to an XHTML file.

Each chunk is made up of a header of one line ("CHK 1 350 MORES" in the illustrated example) and the data main part ("<?xml version="1.0"> and the following" in the illustrated example). The header is constituted by a letter string ("CHK"), a chunk number ("1" in the illustrated example), the size of the data main part ("350"k bytes in the illustrated example), and a continuation flag ("MORE" in the illustrated example). In case of the continuation flag "MORE", the subsequent chunk exists. In case of a continuation flag "LAST", no subsequent chunk exists, that is, the chunk having the continuation flag "LAST" is the last of the chunks having the same chunk number.

The chunks constituting multiplexed data are sent one-sidedly from the client 3a serially in an uncertain order of those concerning an XHTML file and those concerning image data, that is, in a state that random access is impossible.

Figure 5:
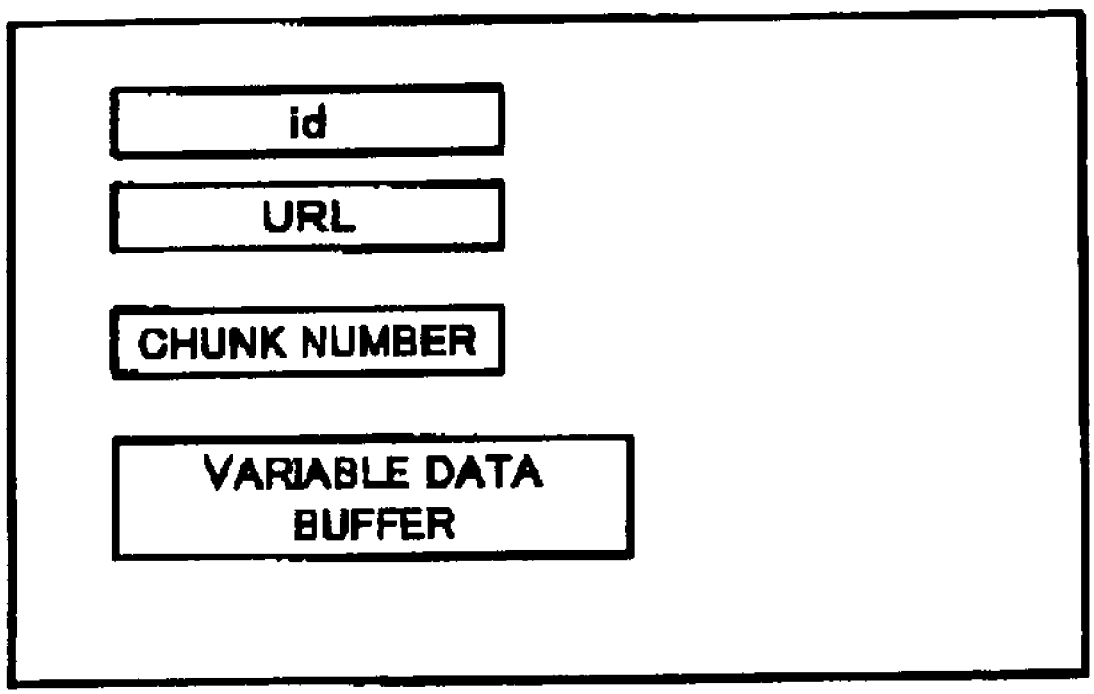
FIG. 5 illustrates a contents buffer provided in the printer.

Next, the contents buffer allotted to the RAM 13 will be described with reference to FIG. 5. As described above, multiplexed data output from the data control section 11a is stored in the contents buffer 13b in units of an XHTML file and image data taken out from one or more chunks having the same chunk number. The contents buffer is divided into areas each identified by an its own identifier id. The areas store therein different XHTML files and image data, respectively. As illustrated in FIG. 5, each area of the contents buffer has the its own identifier id, an URL of image data (only when the area stores therein the image data), a chunk number, and a variable data buffer for storing an XHTML file or image data.

Figure 6:
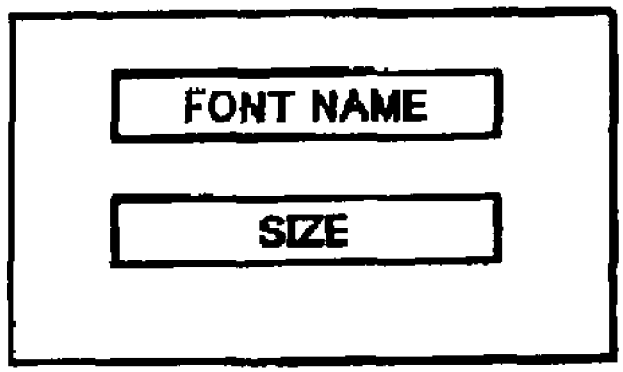
FIG. 6 illustrates layout data output from a layouter to a renderer in the printer.
Figure 6:
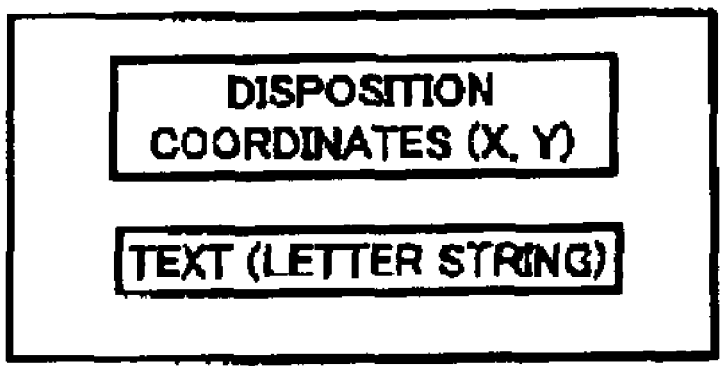
Figure 6:
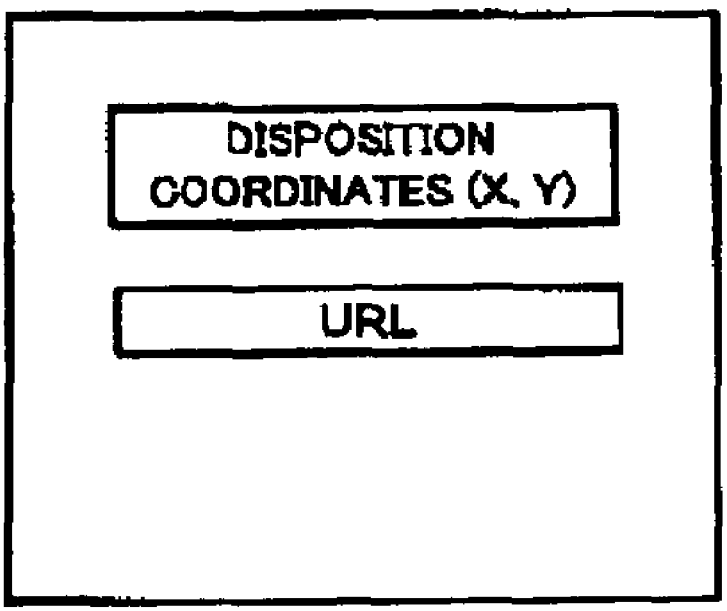

Next, layout data input from the layouter 11b to the renderer 11c will be described with reference to FIG. 6. As illustrated in FIG. 6, layout data is classified into three of "font", "text", and "image". The data "font" is made up of a font name and a font size. The data "text" is made up of disposition coordinates (X, Y) of text data and the text data (letter string) The kind of font and the font size of the text data are specified by "font" laid before "text" of the text data. Therefore, "text" following "font" is sent from the layouter 11b to the renderer 11c. The data "image" is made up of disposition coordinates (X, Y) of image data and the URL of the image data. In layout data of one print page, for example, "font", "text", "font", "text", and "image" are disposed in this order.

Next, data processing in the printer 2a will be described with reference to FIGS. 7 to 17.

Figure 7:
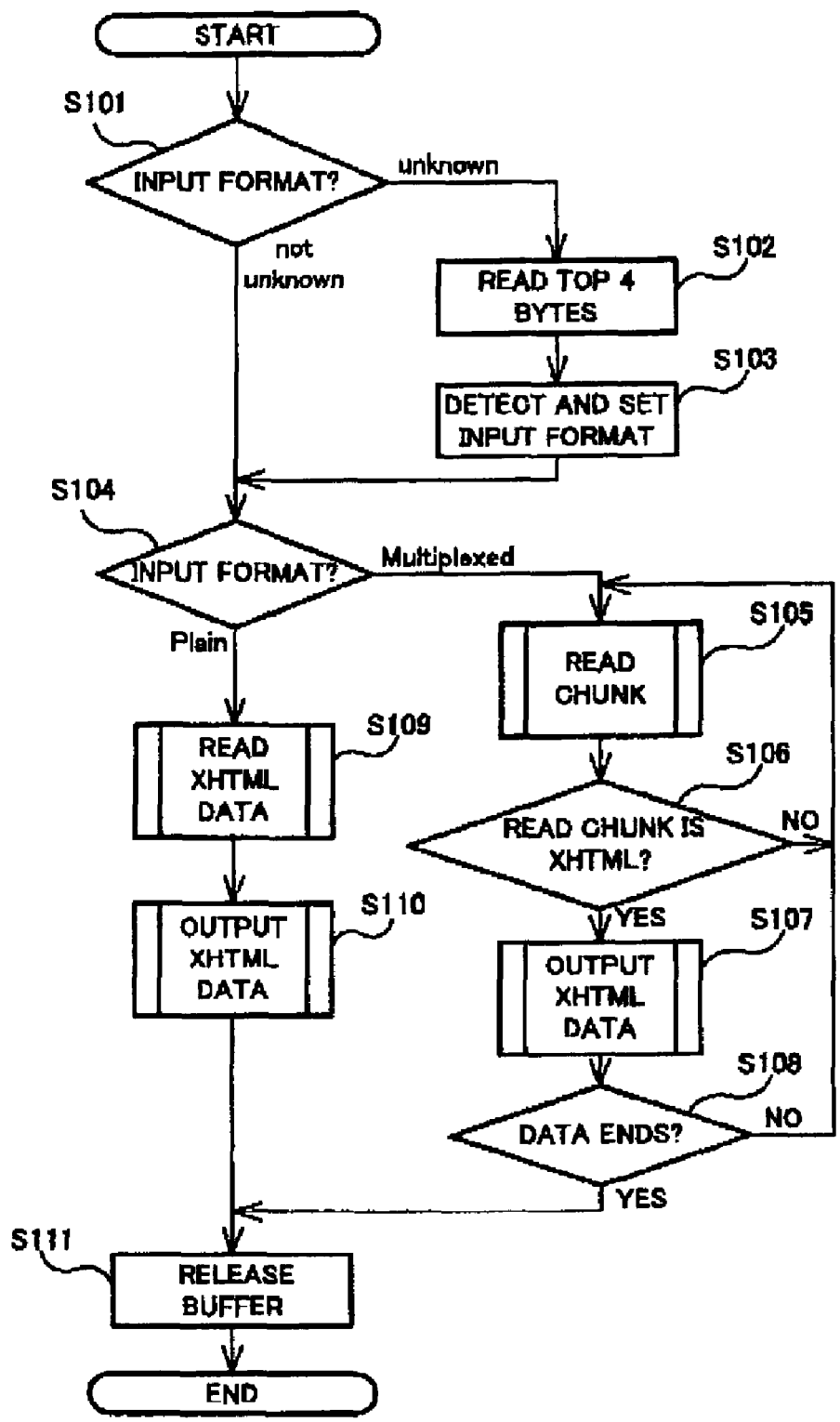
FIG. 7 is a flowchart of XHTML file output processing in a data control section in the printer.

First, processing of outputting an XHTML file from the data control section 11a to the layouter 11b will be described with reference to FIG. 7. As will be described below, the data control section 11a outputs an XHTML file to the layouter 11b. At this time, when the data received from the client 3a is multiplexed data, the data control section 11a decodes the chunks of the multiplexed data and then stores the decoded data as an XHTML file or image data in the contents buffer 13b of the RAM 13.

In Step 101, on the basis of input format information received from the client 3a, the output controller 11a4 of the data control section 11a judges whether the input data is multiplexed data or plain XHTML. The input format information contains information on data format of the input data, that is, information indicating whether the input data is multiplexed data or plain XHTML, and information indicating whether or not the contents of the input data is unknown. When it is concluded from the input format information that the contents of the input data is unknown, that is, "unknown" in S101, the flow advances to Step 102. When it is concluded that the contents of the input data is not unknown, that is, "not unknown" in S101, the flow advances to Step 104. Also in case that no input format information is received from the client 3a, the flow advances to Step 102.

In Step 102, the output controller 11a4 of the data control section 11a reads the top four bytes of the input data. Subsequently in Step 103, the data control section 11a judges by the read top four bytes of the data whether the input format of the input data is multiplexed data or plain XHTML, and thereby detects the input format of the input data. On the basis of the detection result, the data control section 11a then sets the input format flag stored in the flag storage area 13a of the RAM 13 to one of multiplexed data and plain XHTML. The reason why the input format can be detected thus is that multiplexed data divided into chunks starts from "CHK" and plain XHTML starts from "<?xm" as described above.

In step 104, the output controller 11a4 of the data control section 11a judges whether the input format flag stored in the flag storage area 13a has been set to multiplexed data or plain XHTML. When the input format flag is judged to has been set to multiplexed data, that is, "Multiplexed" in S104, the flow advances to Step 105. When the input format flag is judged to has been set to plain XHTML, that is, "Plain" in S104, the flow advances to Step 109.

In Step 105, the data control section 11a reads one chunk in accordance with the order of being received from the client 3a and then stores the chunk in the contents buffer 13b Here, chunk read processing of Step 105 will be described with reference to FIG. 8. First, in Step 121, the data control section 11a reads the header of the chunk. In the example of FIG. 4, the header "CHK 1 350 MORE" is read. The flow then advances to Step 122.

In Step 122, on the basis of the contents of the header of the chunk read in Step 121, the data control section 11a specifies the chunk number of the read chunk. The data control section 11*a* then judges whether or not an area having the sane chunk number as the specified chunk number exists in the contents buffer 13*b*. When it is concluded that no area having the same chunk number exists in the contents buffer 13*b*, that is, NO in S122, that is, when an area for storing the chunk having the read header has not been yet prepared in the contents buffer 13*b*, the flow advances to Step 123. When it is concluded that an area having the same chunk number exists in the contents buffer 13*b*, that is, YES in S122, the flow advances to Step 124.

In Step 123, the data control section 11*a* newly prepares an area having the chunk number of the chunk whose header has been read in Step 121, in the contents buffer.

Subsequently in Step 124, the data control section 11*a* adds the size of the area in the contents buffer 13*b* having the same chunk number as the chunk number contained in the header read in Step 121, to the value contained in the header of the chunk read in Step 121.

In Step 125, the data control section 11*a* reads the main part of the chunk, that is, "<?xml version="1.0"> and the following" in the example of FIG. 4. More specifically, the data control section 11*a* decodes the chunk to take out an XHTML file or image data. The data control section 11*a* then stores the taken-out XHTML file or image data in the corresponding area in the contents buffer 13*b* in accordance with the chunk number.

Referring back to FIG. 7, in Step 106, it is judged whether or not the read chunk is related to an XHTML file. When the chunk is judged not to be related to an XHTML file, that is, NO in S106, the flow returns to step 105, and the data control section 11*a* repeats read of chunk until a desired chunk is read. When the read chunk is judged to be related to an XHTML file, that is, YES in S106, the flow advances to Step 107.

In Step 107, the data control section 11*a* makes control so that the XHTML file related to the chunk read in Step 105 is output to the layouter 11*b*. Subsequently in Step 108, it is judged whether or not the chunks related to the XHTML file have been read. In case the chunks related to the XHTML file have not been read, that is, NO in S108, the flow returns to Step 105. In case the chunks related to the XHTML file have been read, that is, YES in S108, the flow advances to Step 111.

In Step 109, the data control section 11*a* reads an XHTML file sent from the client 3*a* because the input data is plain XHTML. Subsequently in Step 110, the data control section 11*a* outputs the XHTML file read in Step 109 to the layouter 11*b*. The flow then advances to Step 111. In Step 111 the data control section 11*a* deletes the XHTML file from the contents buffer 13*b*. XHTML file output processing is then ended.

Figure 9:
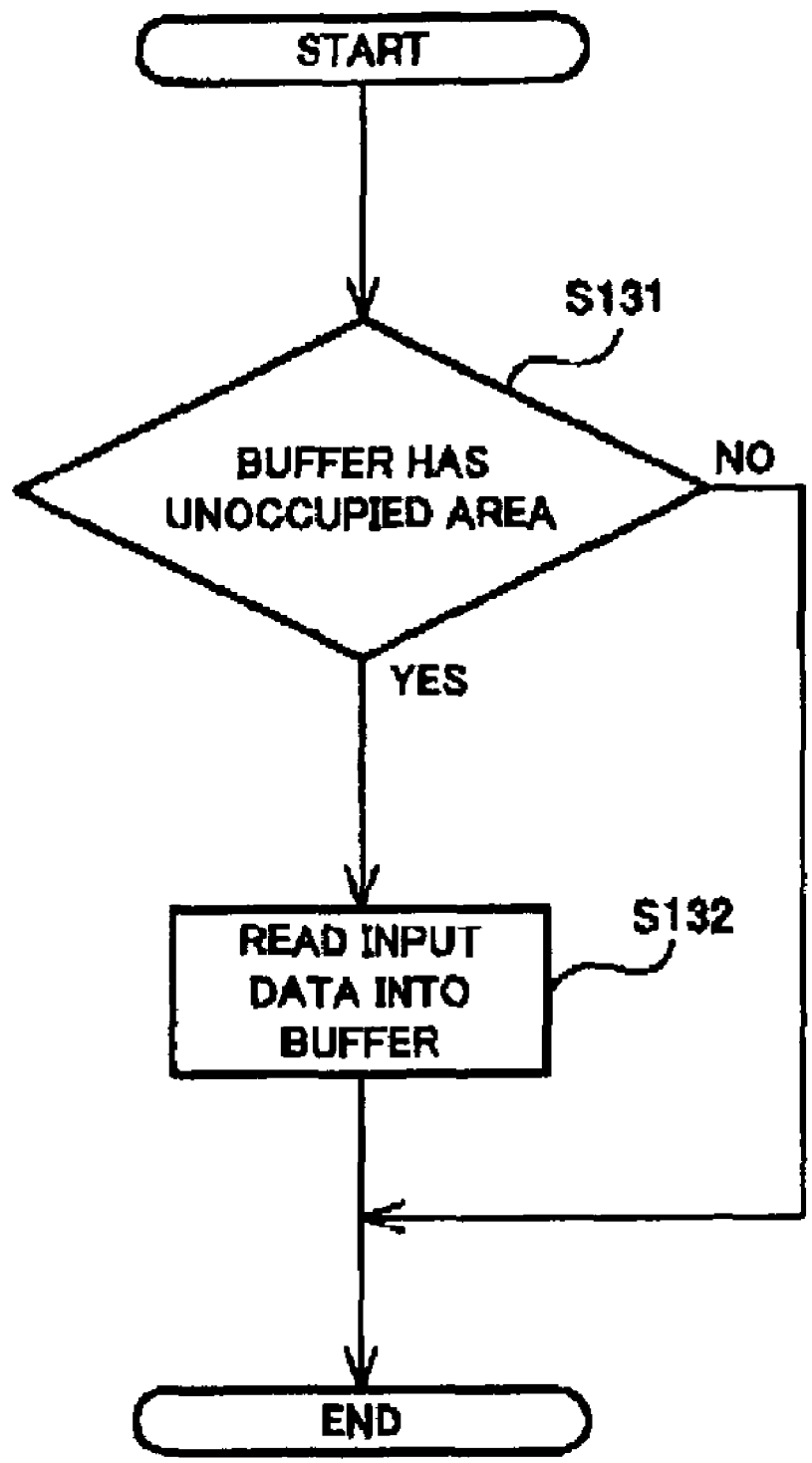
FIG. 9 is a flowchart of processing of Step 105 in FIG. 7, Step 406 in FIG. 15, or Step 507 in FIG. 16.

Here, XHTML file read processing of Step 109 will be described with reference to FIG. 9. First, in Step 131, the data control section 11*a* judges whether or not there is an unoccupied area in the plain XHTML buffer in the RAM 13. When there is an unoccupied area, that is, YES in S131, the flow advances to Step 132, wherein the data control section 11*a* reads an XHTML file into the plain XHTML buffer. When there is no unoccupied area, that is, NO in S131, the flow skips Step 132 and XHTML file read processing is ended.

Figure 10:
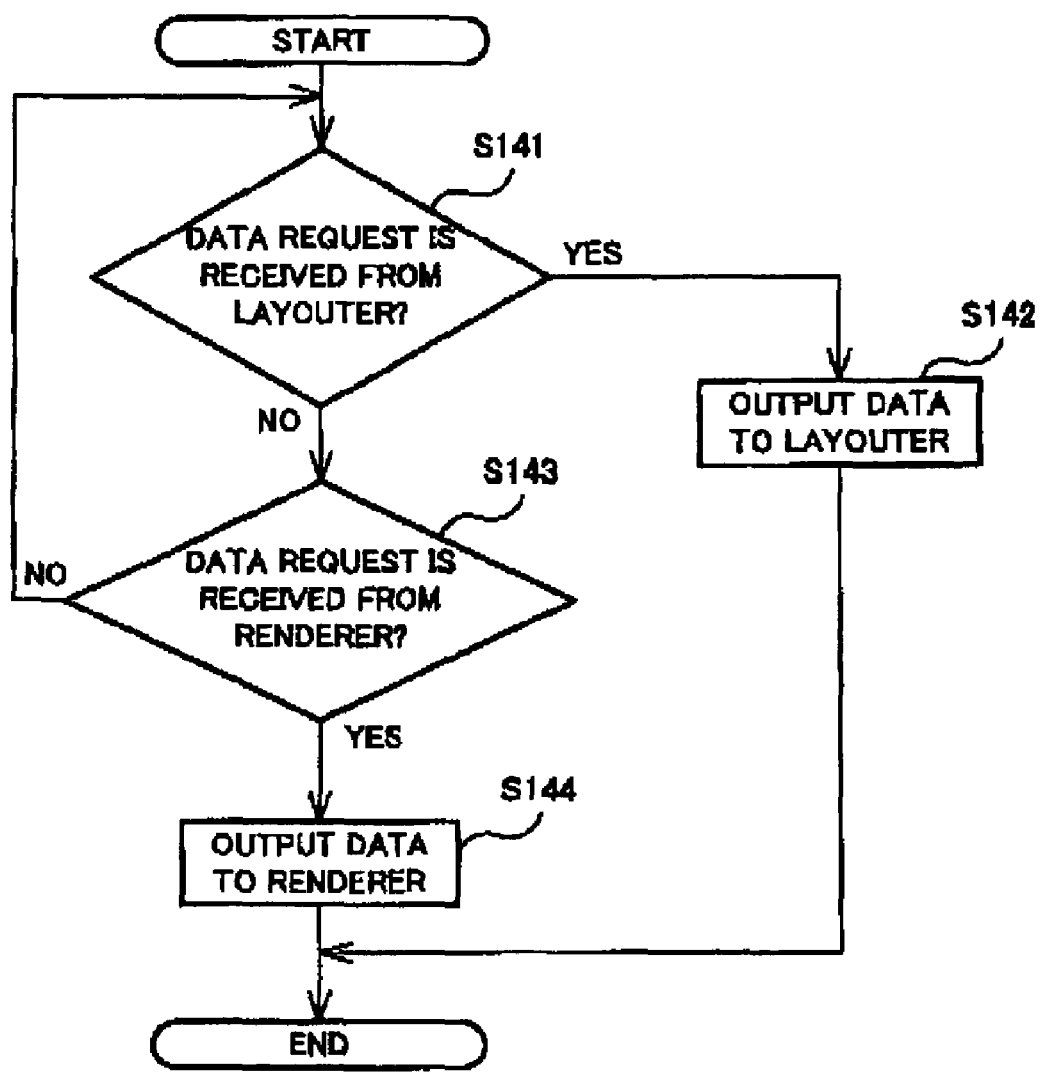
FIG. 10 is a flowchart of processing of step 110 in FIG. 7 or Step 503 or 508 in FIG. 16.

Next, data output processing of Step 107 and Step 110 will be described with reference to FIG. 10. Processing of FIG. 10 can also cope with an image data request from the renderer 11*c* so that processing of FIG. 10 is common to processing of Step 503 or 508 as will be described later with reference to FIG. 16. However, in data output processing of Step 107 and Step 110, the data control section 11*a* receives only a data request from the layouter 11*b*. FIG. 10 illustrates processing of the data control section 11*a* outputting data to the layouter 11*b* or renderer 11*c*. Data to be output is determined by designating an area in the contents buffer 13*b* with an URL of image data. If the signal designating data to be output contains no URL of image data, the first area in the contents buffer 13*b* is designated. In this embodiment, the first area in the contents buffer 13*b* always stores therein an XHTML file.

First, in Step 141, it is judged whether or not the data control section 11*a* has received a request signal for image data from the layouter 11*b*. When the data control section 11*a* has received a request signal for image data from the layouter 11*b*, that is, YES in S141, the flow advances to Step 142, wherein the data control section 11*a* outputs the related XHTML file to the layouter 11*b*. when the data control section 11*a* has received no request signal for image data from the layouter 11*b*, that is, NO in S141, the flow advances to Step 143.

In Step 143, it is judged whether or not the data control section 11*a* has received an image data request signal from the renderer 11*c*. When the data control section 11*a* has received no image data request signal from the renderer 11*c*, that is, NO in S143, the flow returns to Step 141. When the data control section 11*a* has received an image data request signal from the renderer 11*c*, that is, YES in S143, the flow advances to Step 144, wherein the data control section 11*a* outputs the requested image data to the renderer 11*c*.

Figure 11:
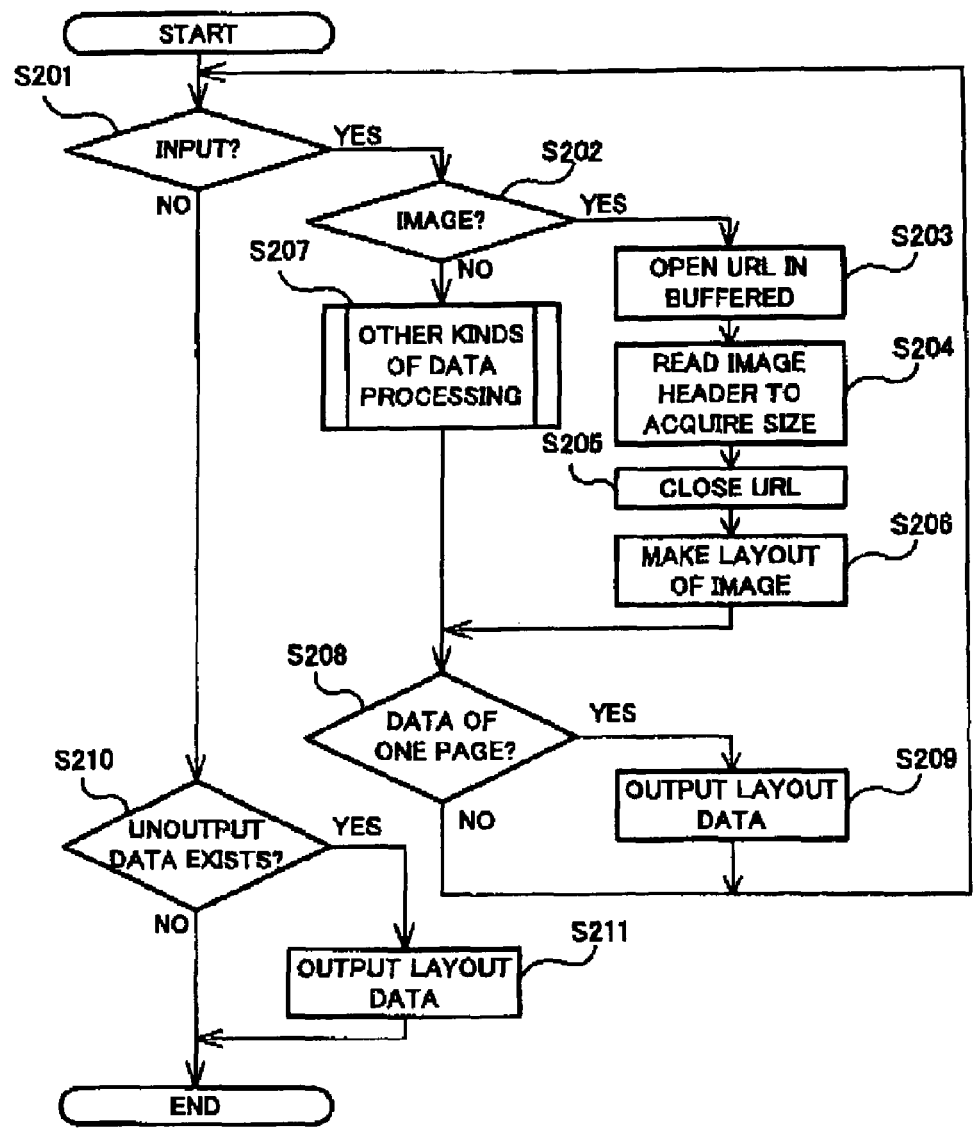
FIG. 11 is a flowchart of layout processing in the layouter in the printer.

Next, layout processing in the layouter 11*b* will be described with reference to FIG. 11. First, in Step 201, the layouter 11*b* judges whether or not the layouter 11*b* is receiving data input related to an XHTML file from the data control section 11*a*, When the layouter 11*b* is receiving no data input, that is, data input has ended, that is, NO in S201, the flow advances to Step 210. When the layouter 11*b* is receiving data input, that is, YES in S201, the flow advances to Step 202.

Figure 12:
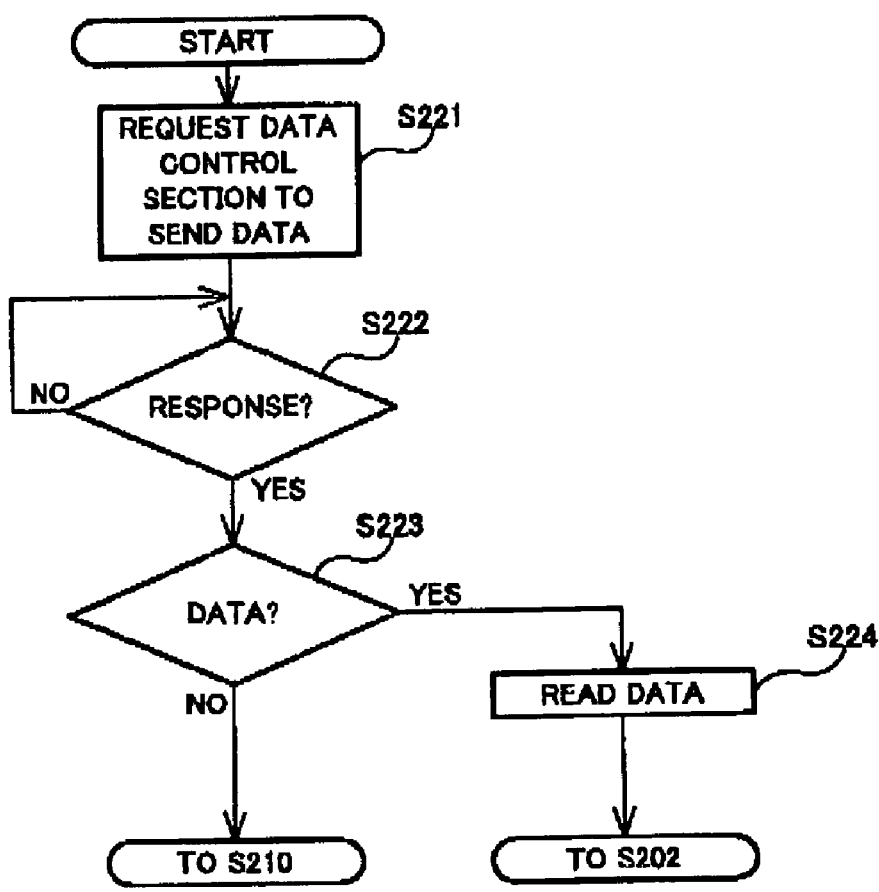
FIG. 12 is a flowchart of processing of Step 201 in FIG. 11.

Here, data input presence/absence judgment processing of Step 201 will be described with reference to FIG. 12. First, in Step 221, the layouter 11*b* requests the data control section 11*a* to send HTML file data. In Step 222, the layouter 11*b* waits for a response to the request. When the layouter 11*b* receives a response, that is, YES in S222, the flow advances to Step 223. In Step 223, the layouter 11*b* judges whether or not the response signal contains therein XHTML file data for printing. When the signal contains therein XHTML file data, that is, YES in S223, the flow advances to Step 224. In Step 224, the layouter 11*b* reads the XHTML file data. The flow then advances to Step 202. On the other hand, when the response signal contains therein no XHTML file data, that is, NO in S223, the flow advances to Step 210.

Referring back to FIG. 11, in Step 202, the layouter 11*b* judges whether or not the data input from the data control section 11*a* includes therein a tag <img> concerning paste of image data. When the data includes therein a tag <img>, that is, YES in S202, the flow advances to Step 203. When the data includes therein no tag <img>, that is NO in S202, the flow advances to Step 207. In Step 207, other kinds of data processing, for example, layout processing for text data included in the XHTML file and read processing of XHTML data from the buffer, are performed. The flow then advances to Step 208.

In Step 203, the request signal generator 11*b*1 of the layouter 11*b* generates an image data request signal for requesting the data control section 11*a* to open the URL described in the tag <img>, and then sends the request signal to the data control section 11*a*. At this time, the request signal generator 11*b*1 sets the protection flag included in the request signal to "BUFFERED", which means that the data control section 11*a* must keep the image data after outputting the image data in response to the request.

Subsequently in Step 204, the layouter 11b reads the header of the image data supplied from the data control section 11a to acquire dimensions information on the image data.

Figure 13:
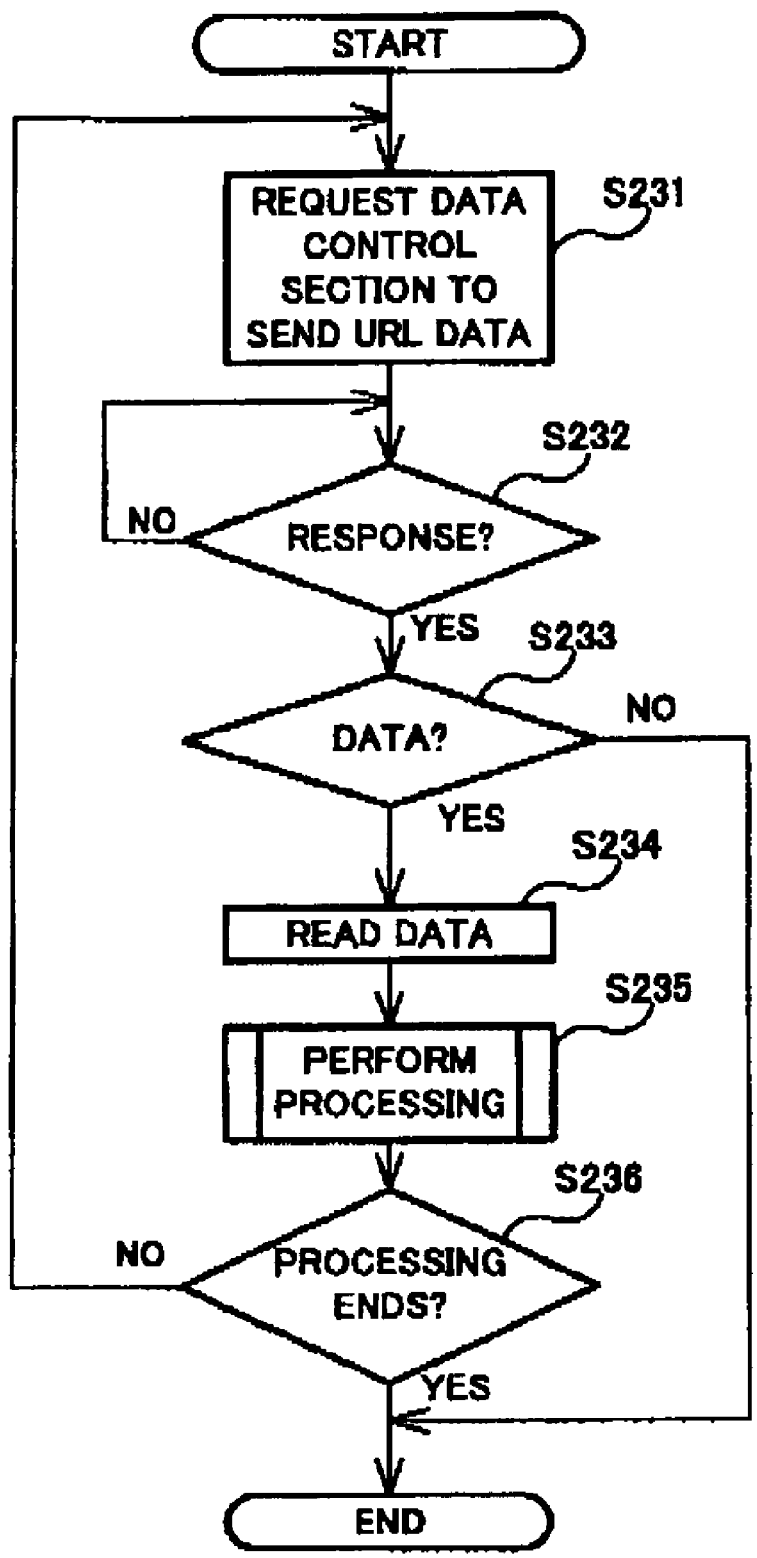
FIG. 13 is a flowchart of processing of Step 204 in FIG. 11 or Step 304 in FIG. 14.

Here, image dimensions information acquirement processing of Steps 203 and 204 will be described with reference to FIG. 13. Processing of FIG. 13 is common to processing of Steps 303 and 304 as will be described with reference to FIG. 14, except processing of Steps 234 to 236. First, in Step 231, the layouter 11b generates an image data request signal in its request signal generator 11b1 and then sends the generated request signal to the data control section 11a. In Step 232, the layouter 11b waits for a response to the request. When the layouter 11b receives a response, that is, YES in S232, the flow advances to Step 233. In Step 233, the layouter 11b judges whether or not the response signal contains therein image data. When the response signal contains therein image data, that is, YES in S233, the flow advances to Step 234. In Step 234, the layouter 11b reads the header of the image data. In step 235, the layouter 11b takes out dimensions information on the image data from the read header. In Step 236, when it is concluded that the layouter 11b could not take out dimensions information on the image data, that is, NO in S236, the flow returns to Step 231. When it is concluded that the layouter 11b could take out dimensions information on the image data, that is, YES in S236, image dimensions information acquirement processing is ended.

Referring back to FIG. 11, in Step 205, the layouter 11b requests the data control section 11a to close the URL opened in Step 203. In accordance with the process from Step 203 to Step 205, the data control section 11a performs processing as will be described later with reference to FIGS. 15 to 17.

In Step 206, the layout section 11b2 of the layouter 11b makes an layout of the image data on the basis of the dimensions information on the image data acquired in Step 204. The flow then advances to Step 208.

In Step 208, the layouter 11b judges whether or not a layout of data for printing one page has been made. When the layout of data for printing one page has been made, that is, YES in S208, the flow advances to Step 209. When the layout of data for printing one page has not yet been made, that is, NO in S208, the flow returns to Step 201.

In Step 209, the output section 11b3 of the layouter 11b is outputs, to the renderer 11c, layout data for printing one page, generated by making a layout of text data and image data. The flow then returns to Step 201.

In Step 210, the layouter 11b judges whether or not 2a unoutput layout data exists. When unoutput layout data exists, that is, YES in S210, the flow advances to Step 211. In Step 211, the unoutput layout data is output from the output section 11b3 to the renderer 11c. Layout processing is then ended. On the other hand, no unoutput layout data exists, that is NO in S210, the flow skips Step 211 and layout processing is ended.

As described above, the layouter 11b requests the data control section 11a to send necessary image data and thereby acquires the image data from the data control section 11a. As understood from FIG. 11, when acquiring the image data, the layouter 11b performs the same process in both of the cases wherein data sent from the client 3a to the data control section 11a is multiplexed data and wherein the data is plain XHTML, that is, irrespective of the input format of the input data.

Figure 14:
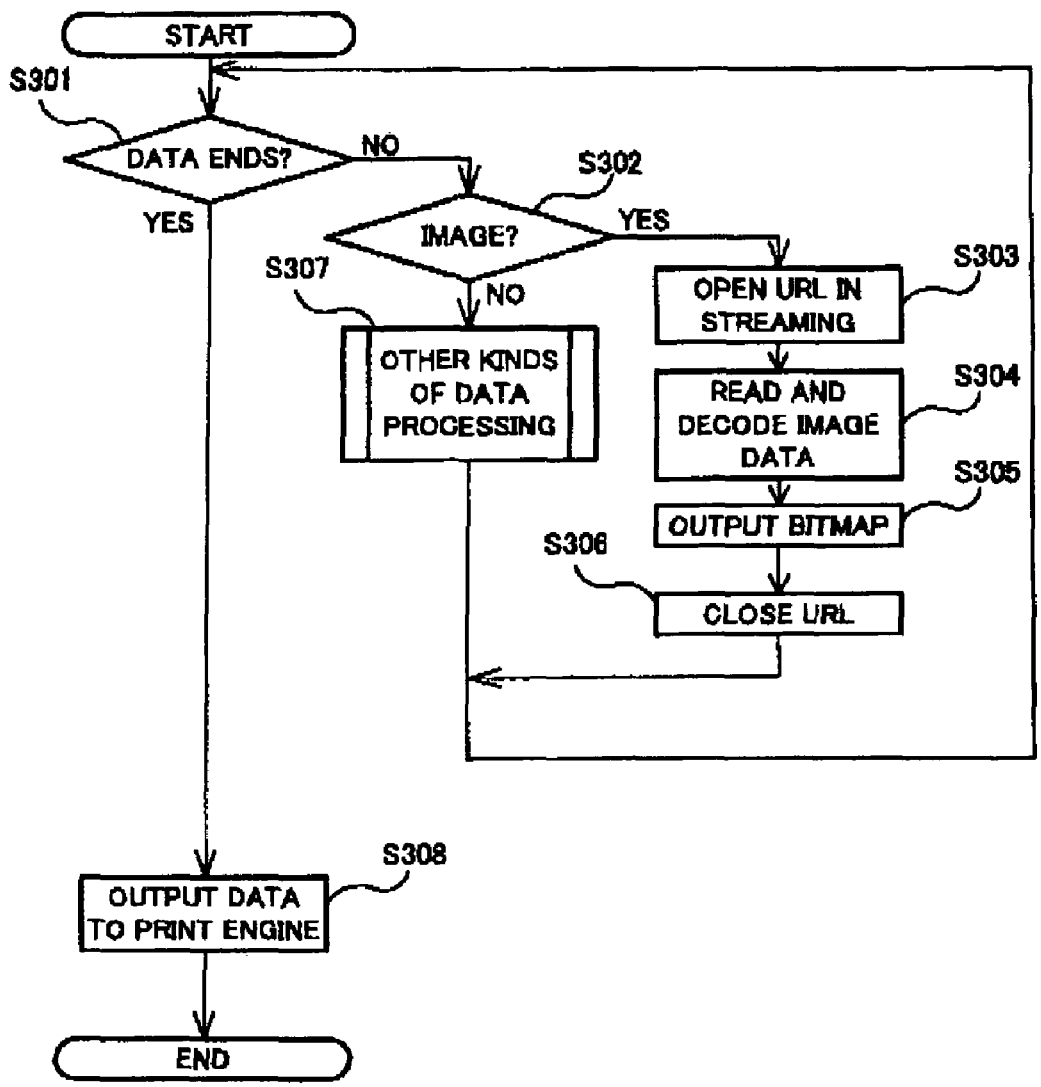
FIG. 14 is a flowchart of rendering processing in the renderer in the printer.

Next, rendering process in the renderer 11c will be described with reference to FIG. 14. First, in Step 301, the renderer 11c judges whether or not input of layout data from the layouter 11b for printing one page has been completed. When the input of layout data for printing one page has not yet been completed, that is NO in S301, the flow advances to Step 302. When the input of layout data for printing one page has been completed, that is, YES in S301, the flow advances to Step 308.

In Step 302, the renderer 11c judges whether or not the layout data newly input from the layouter 11b contains therein "image". When the data contains therein "image", that is, YES in S302, the flow advances to Step 303. When the data does not contain therein "image", that is, NO in S302, the flow advances to Step 307. In Step 307, other kinds of data processing, for example, rendering processing for text data contained in "text" and read processing for layout data from the layouter 11b, are performed. The flow then returns to Step 301.

In Step 303, the request signal generator 11c1 of the renderer 11c generates an image data request signal for requesting the data control section 11a to open the URL described in "image", and then sends the request signal to the data control section 11a. At this time, the request signal generator 11c1 sets a flag included in the request signal to "STREAMING", which means that the data control section 11a deletes the image data after outputting the image data in response to the request.

Subsequently in Step 304, the rendering section 11c2 of the renderer 11c reads the image data supplied from the data control section 11a. The rendering section 11c2 then decodes the read image data to convert it into bitmap data.

Image decode processing of Steps 303 and 304 is the same as processing of FIG. 13 except processing of Steps 234 to 236. More specifically, first, in Step 231, the renderer 11c generates an image data request signal in its request signal generator 11c1 and then sends the generated request signal to the data control section 11a. In Step 232, the renderer 11c waits for a response to the request. When the renderer 11c receives a response, that is, YES in S232, the flow advances to step 233. In Step 233, the renderer 11c judges whether or not the response signal contains therein image data. When the signal contains therein image data, that is, YES in S233, the flow advances to Step 234. In Step 234, the renderer 11c reads the image data. In Step 235, the renderer 11c decodes the read image data in its rendering section 11c2. In Step 236, when it is concluded that the renderer 11c could not decode the image data, that is, NO in S236, the flow returns to Step 231. When it is concluded that the renderer 11c could decode the image data, that is, YES in S236, image decode processing is ended.

Referring back to FIG. 14, in Step 305, the rendering section 11c2 of the renderer 11c outputs bitmap data of the image data obtained in Step 304. That is, the rendering section 11c2 arranges the bitmap data at the position (X, Y) designated by "image".

In Step 306, the renderer 11c requests the data control section 11a to close the URL opened in Step 303. The flow then returns to Step 301. In accordance with the process from Step 303 to Step 306, the data control section 11a performs processing as will be described later with reference to FIGS. 15 to 17.

In Step 308, the renderer 11c outputs, to the print engine 14 (FIG. 3), rendering data for printing one page, generated by rendering text data and image data. Rendering process is then ended. The print engine 14 (FIG. 3) performs printing on a print medium on the basis of the rendering data from the renderer 11c.

As described above, the renderer 11c requests the data control section 11a to send necessary image data and thereby acquires the image data from the data control section 11a. As understood from FIG. 14, when acquiring the image data, the renderer 11c performs the same process in both of the cases wherein data sent from the client 3a to the data control section 11a is multiplexed data and wherein the data is plain XHTML, that is, irrespective of the input format of the input data.

Figure 15:
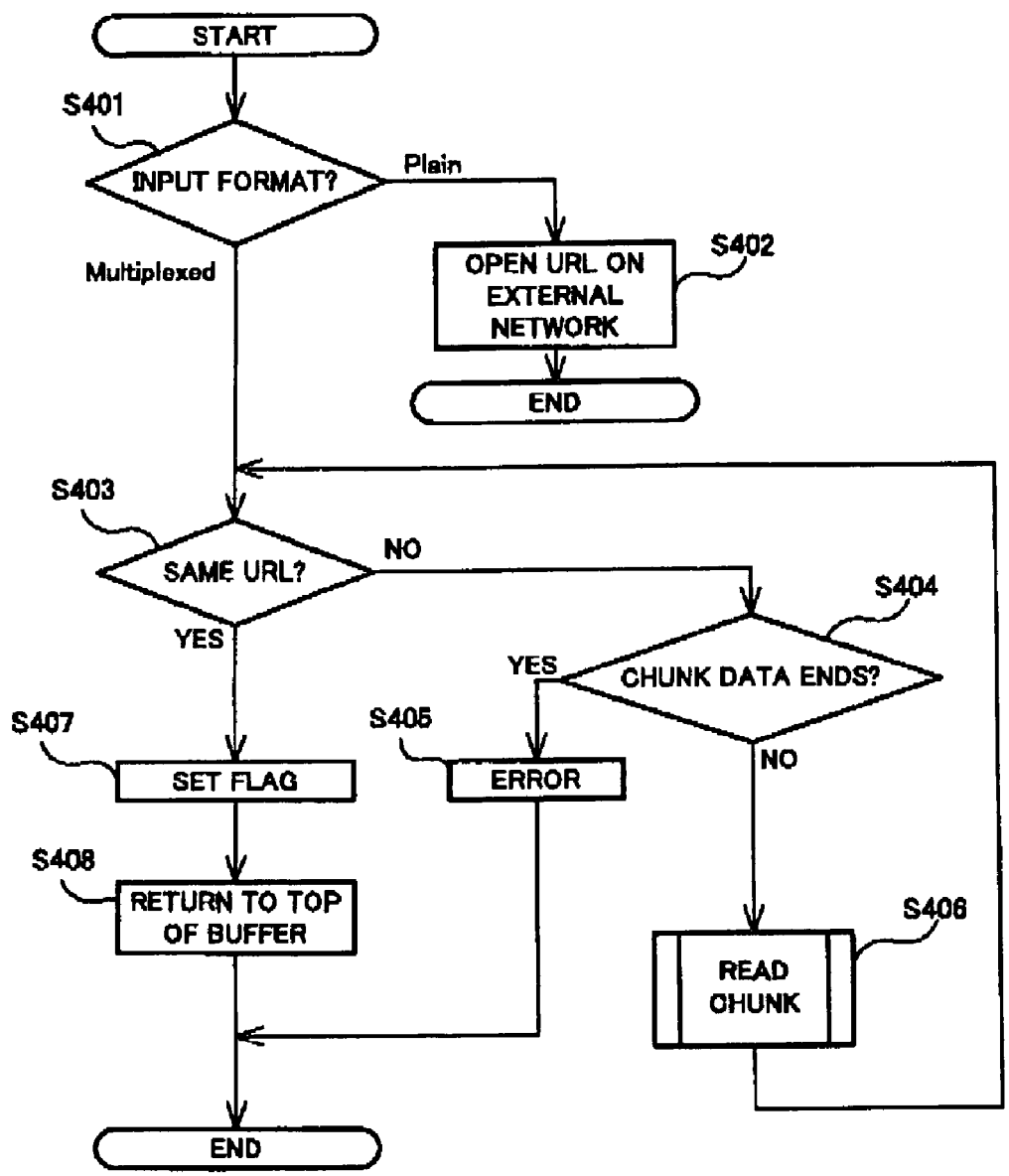
FIG. 15 is a flowchart of image data output processing in the data control section in the printer.
Figure 16:
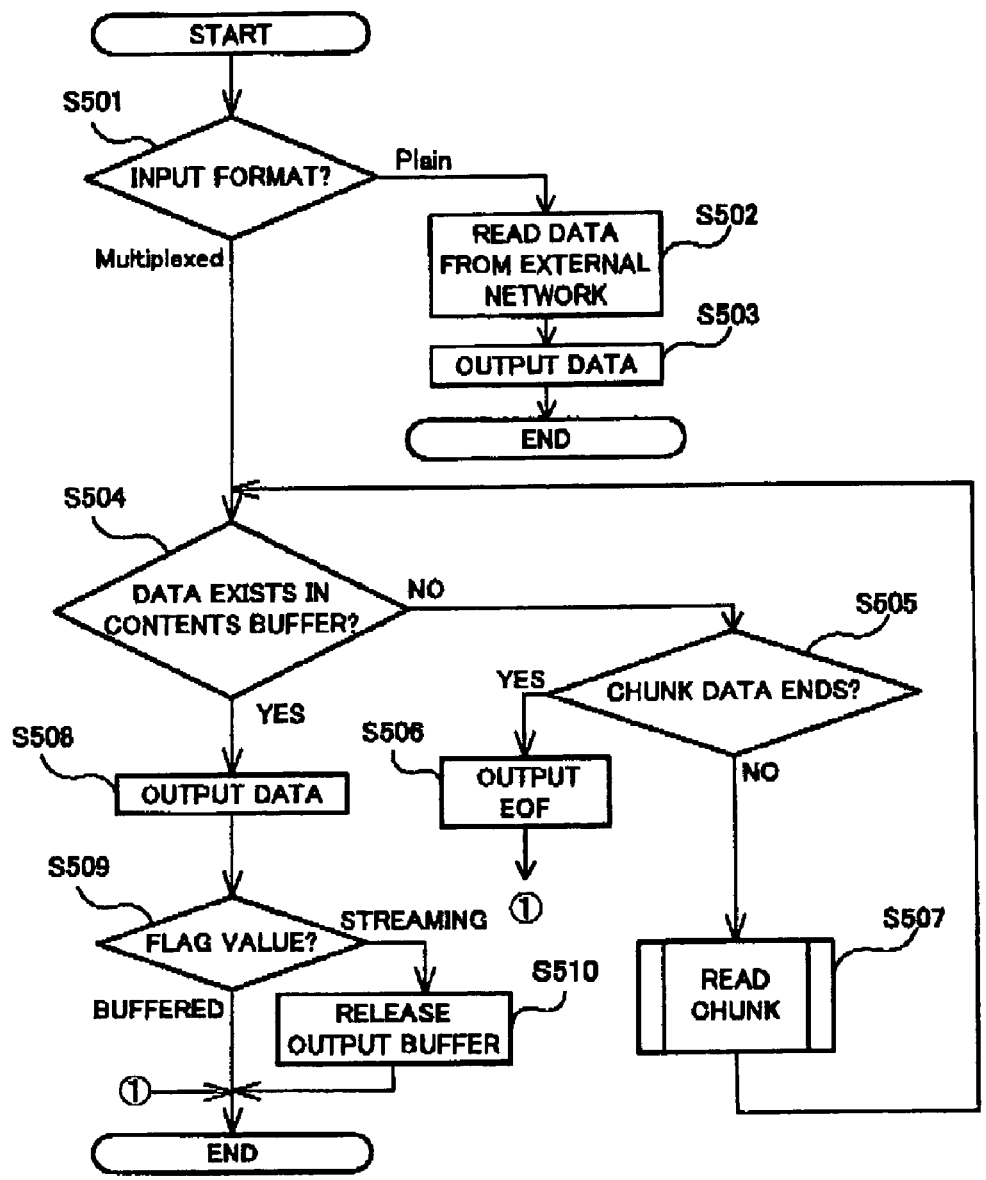
FIG. 16 is a flowchart of image data output processing in the data control section in the printer.
Figure 17:
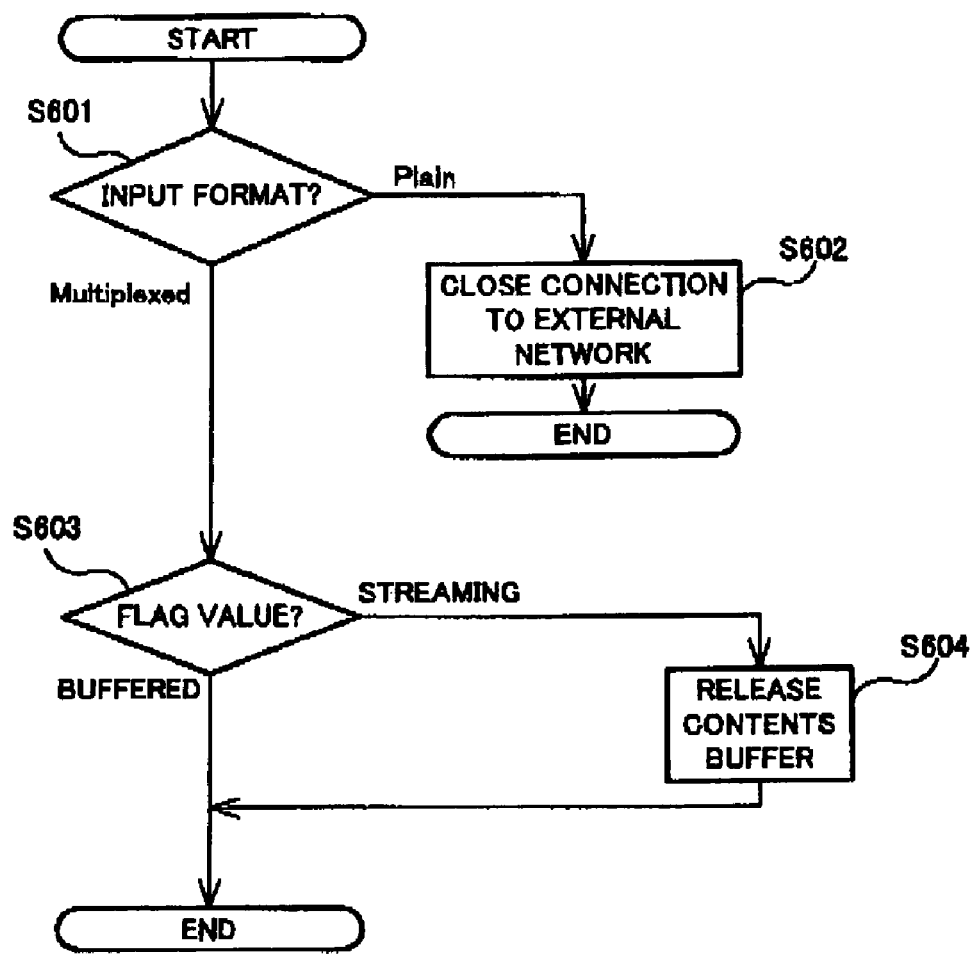
FIG. 17 is a flowchart of image data output processing in the data control section in the printer.

Next, image data output processing in the data control section 11a will be described with reference to FIGS. 15 to 17. Image data output processing is performed in the order of FIG. 15, FIG. 16, and FIG. 17. FIG. 15 illustrates image data read start processing starting in response to Step 203 in FIG. 11 or Step 303 in FIG. 14. FIG. 16 illustrates image data read processing corresponding to Step 204 in FIG. 11 or Step 304 in FIG. 14 and starting when processing of FIG. 15 is ended. FIG. 17 illustrates image data read end processing starting in response to Step S205 in FIG. 11 or Step 306 in FIG. 14. Processing of FIGS. 15 to 17 is performed every time when image data is output from the data control section 11a to the layouter 11b or the renderer 11c. Processing of FIGS. 15 to 17 is performed at least two times in printing one time.

First, processing of FIG. 15 will be described. In Step 401, for judging whether the input format of data received from the client 3a is multiplexed data or plain XHTML, the detector 11a1 of the data control section 11a judges whether the input format flag stored in the flag storage area 13a has been set to multiplexed data or plain XHTML. When the flag has been set to plain XHTML, that is, "Plain" in S401, the flow advances to Step 402. When the flag has been set to multiplexed data, that is, "Multiplexed" in S401, the flow advances to Step 403. In Step 401, the value set in Step 103 in FIG. 7 is judged.

In Step 402, the downloader 11a2 of the data control section 11a opens an URL stored in a device on an external network, for example, the web server 6, which URL is contained in the XHTML file constituting the plain XHTML. Processing of FIG. 15 is then ended.

In Step 403, the retriever 11a3 of the data control section 11a judges whether or not the URLs of image data related to one or more chunks already read in Step 105 in FIG. 7 or Step 406 as will be described later include the same URL as the URL contained in the request signal received from the layouter 11b or renderer 11c. When the same URL is not included, that is, NO in S403, the flow advances to Step 404. When the same URL is included, that is, YES in S403, the flow advances to Step 407.

In Step 404, the retriever 11a3 of the data control section 11a judges whether or not all chunks have been read. In case all chunks have been read, that is, YES in S404, the flow advances to Step 405. In Step 405, because no chunk has been found having the same URL as the URL of image data contained in the request signal received from the layouter 11b or renderer 11c even though the multiplexed data has been read to the end, "error" is output. Processing of FIG. 15 is then ended. On the other hand, when all chunks have not yet been read, that is, NO in S404, the flow advances to Step 406.

Figure 8:
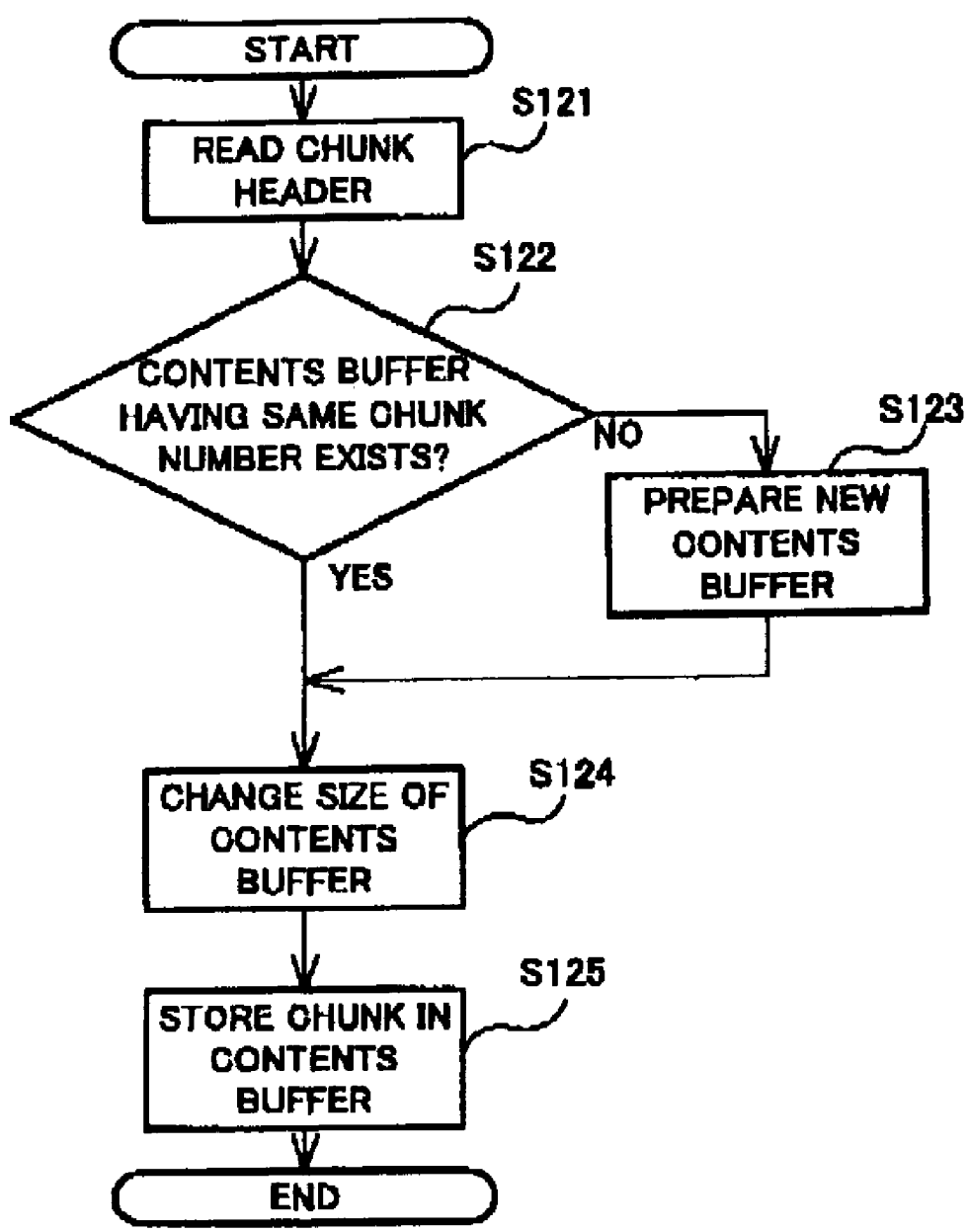
FIG. 8 is a flowchart of processing of Step 106 in FIG. 7.

In Step 406, the retriever 11a3 of the data control section 11a reads one chunk, which has not yet been read, in accordance with chunk read processing of FIG. 8. The flow then returns to Step 403. Thus, chunk read is repeated until a chunk related to the image data having the same URL as the URL contained in the request signal received from the layouter 11b or renderer 11c, is read.

In Step 407, the data control section 11a sets the protection flag stored in the protection flag storage area 13c in the RAM 13 to "BUFFERED" or "STREAMING" in accordance with the setting of the protection flag included in the request signal from the layouter 11b or renderer 11c.

Subsequently in Step 408, the data control section 11a returns the data read position to the top of the contents buffer 13b. This is for starting to read the next multiplexed data from the top chunk. Processing of FIG. 15 is then ended.

Next, processing of FIG. 16 will be described. In Step 501, for judging whether the input format of data received from the client 3a is multiplexed data or plain XHTML, the detector 11a1 of the data control section 11a judges whether the input format flag stored in the flag storage area 13a has been set to multiplexed data or plain XHTML. When the flag has been set to plain XHTML, that is, "Plain" in S501, the flow advances to Step 502. When the flag has been set to multiplexed data, that is, "Multiplexed" in S501, the flow advances to Step 504.

In Step 502, the downloader 11a2 of the data control section 11a downloads image data at the URL opened in Step 402 in FIG. 15, related by a tag <img> to the XHTML file constituting the plain XHTML, from a device on an external network, for example, the web server 6 (FIG. 1).

Subsequently in Step 503, the output controller 11a4 of the data control section 11a outputs, to the layouter 11b or renderer 11c, the image data downloaded by the downloader 11a2 in step 502. Processing of FIG. 16 is then ended.

In Step 504, the retriever 11a3 of the data control section 11a judges whether or not image data having the same URL as the URL contained in the request signal received in the layouter 11b or renderer 11c is stored in the contents buffer 13b, that is, whether or not the chunk related to the image data designated by the URL contained in the request signal has been read in Step 105, Step 406, or Step 507 as will be described later. When the contents buffer 13b does not stores therein the image data, that is, NO in S504, the flow advances to Step 505. When the contents buffer 13b stores therein the desired image data, that is, YES in S504, the flow advances to Step 508.

In step 505, the retriever 11a3 of the data control section 11a judges whether or not all chunks have been read. When all chunks have been read, that is, YES in S505, the flow advances to Step 506. In Step 506, because the designated file has ended, "EOF" (End Of File) is output to the layouter 11b or renderer 11c. Processing of FIG. 16 is then ended. On the other hand, when all chunks have not yet been read, that is, NO in S505, the flow advances to Step 507.

In Step 507, the retriever 11a3 of the data control section 11a reads one chunk, which has not yet been read, in accordance with chunk read processing of FIG. 8. The flow then returns to Step 504. Thus, chunk read is repeated until the desired image data is stored in the contents buffer 13b in Step 507.

In Step 508, the output controller 11a4 of the data control section 11a outputs image data from the contents buffer 13b in the RAM 13 to the layouter 11b when the layouter 11b has requested the image data, and to the renderer 11c when the renderer 11c has requested the image data.

In Step 509, the data control section 11a judges whether the protection flag has been set to "BUFFERED" or "STREAMING" in Step 407 in FIG. 15. In case the protection flag has been set to "BUFFERED", that is, "BUFFERED" in S509, processing of FIG. 16 is ended without deleting the image data from the contents buffer 13b in the RAM 13 because the image data may be used again, In case the protection flag has been set to "STREAMING", that is, "STREAMING" in S509, the flow advances to Step 510.

In Step 510, the data control section 11a deletes the image data output in Step 500, from the contents buffer 13b because the image data will not be used again.

Next, processing of FIG. 17 will be described. In Step 601, for judging whether the input format of data received from the client 3a is multiplexed data or plain XHTML, the data control section 11a judges whether the input format flag stored in the flag storage area 13a has been set to multiplexed data or plain XHTML. When the flag has been set to plain XHTML, that is, "Plain" in S601, the flow advances to Step 602. When the flag has been set to multiplexed data, that is, "Multiplexed" in S601, the flow advances to Step 603.

In Step 602, the downloader 11a2 of the data control section 11a closes the URL stored in the device on the external network, for example, the web server 6 (FIG. 1), opened in Step 402 in FIG. 15, which URL is contained in the XHTML file constituting the plain XHTML. Processing of FIG. 17 is then ended.

In Step 603, the data control section 11a judges whether the protection flag has been set to "BUFFERED" or "STREAMING" in Step 407 in FIG. 15, In case the protection flag has been set to "BUFFERED", that is, "BUFFERED" in S603, processing of FIG. 17 is ended without deleting the image data from the contents buffer 13b in the RAM 13 because the image data may be used again. In case the protection flag has been set to "STREAMING", that is, "STREAMING" in S603, the flow advances to Step 604.

In Step 604, because the image data of the URL processed will not be used again, the data control section 11a releases the contents buffer 13b in the RAM 13 to delete the image data. Processing of FIG. 17 is then ended.

As described above, in processing of any of FIGS. 15 to 17, it is first judged whether the input format of the input data received from the client 3a is multiplexed data or plain XHTML. In case of plain XHTML, the image data requested by the layouter 11b or renderer 11c is acquired from an external network and the acquired image data is output to the layouter 11b or renderer 11c. In case of multiplexed data, image data is retrieved from the contents buffer 13b in the RAM 13 and the retrieved image data is output to the layouter 11b or renderer 11c.

In this embodiment, as for the data control section 11a, processing varies in accordance with the input format of input data from the client 3a, as illustrated in FIGS. 7 to 10 and 15 to 17. Contrastingly, as for the layouter 11b and the renderer 11c, processing is the same irrespective of the input format of input data from the client 3a, as illustrated in FIGS. 11 to 14. Therefore, even if there is a change in or an addition to the input format of input data from the client 3a, for example, in case that input data having an input format other than multiplexed data and plain XHTML is sent from the client 3a, it suffices that only the construction of the data control section 11a is changed. Thus, the development period of printer can be shortened and the development cost of printer can be lowered. Viewed at another angle, the same construction of either of the layouter 11b and the renderer 11c can be used even if there is a change in or an addition to the input format of input data from the client 3a.

Because the layouter 11b requests image data from the data control section 11a with setting the protection flag to "BUFFERED", the image data is kept stored in the contents buffer 13b after being output to the layouter 11b. Contrastingly, the renderer 11c requests image data from the data control section 11a with setting the protection flag to "STREAMING", the image data is deleted from the contents buffer 13b after being output to the renderer 11c. Thus, the memory capacity of the RAM 13 can efficiently be used. Besides, an increase in necessary memory capacity, which is apt to occur in case of a program being constituted by modules, can be suppressed.

Figure 18:
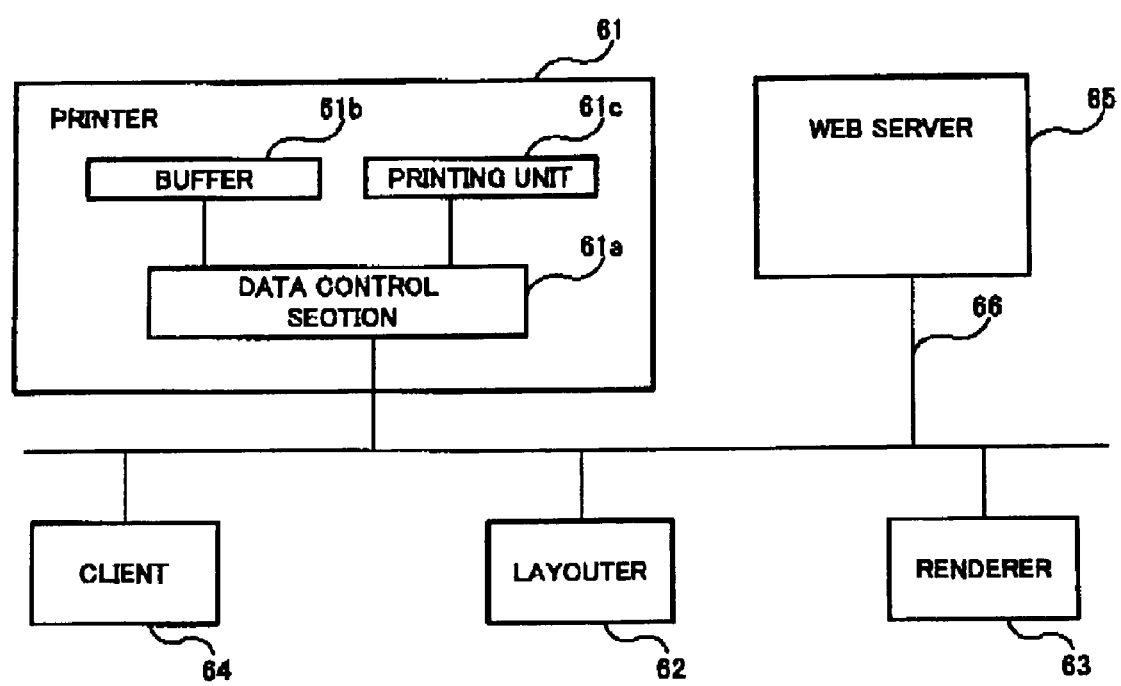
FIG. 18 illustrates a network system including a printer according to a second embodiment of the present invention.
Figure 19:
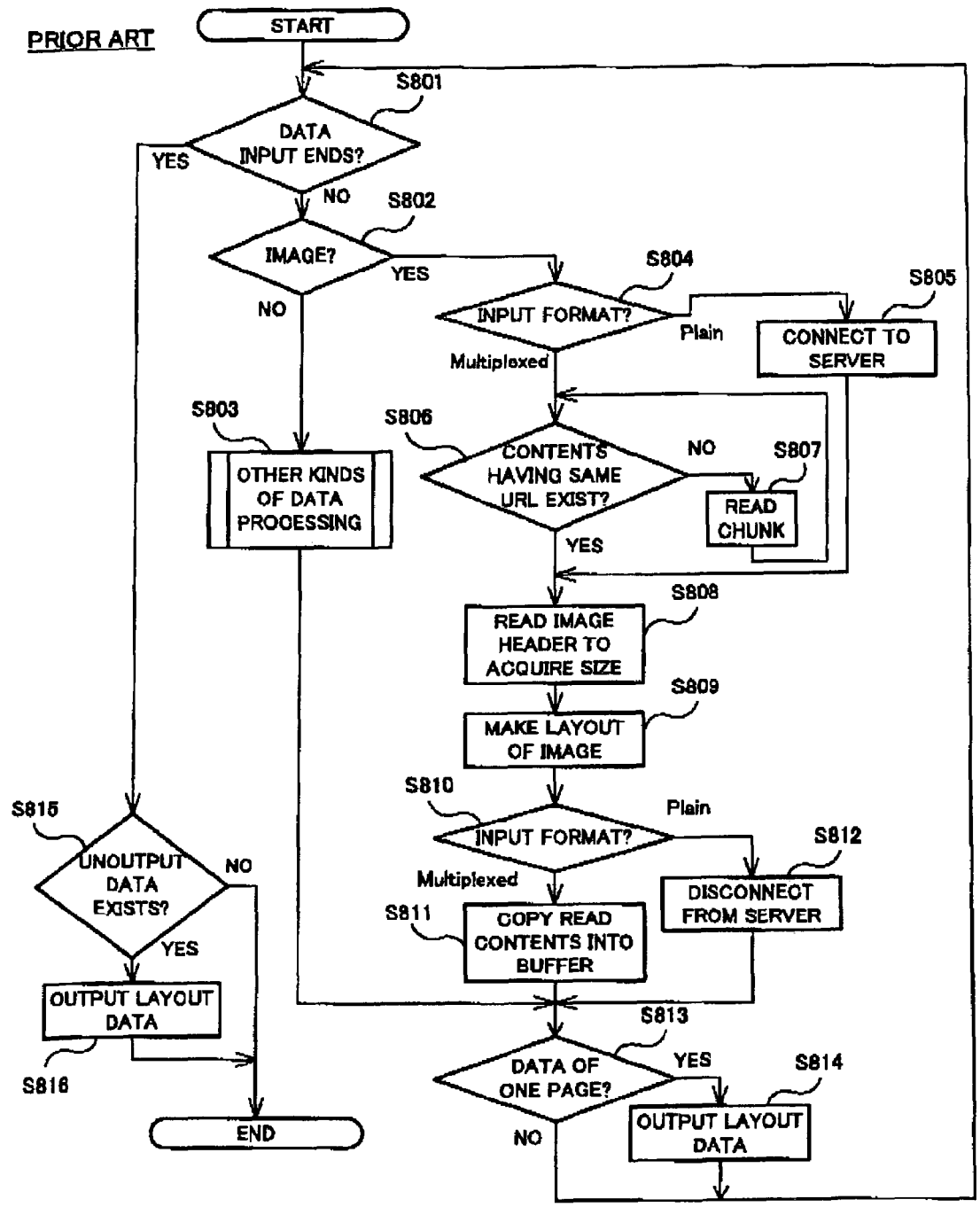
FIG. 19 is a flowchart of layout processing in a conventional printer.
Figure 20:
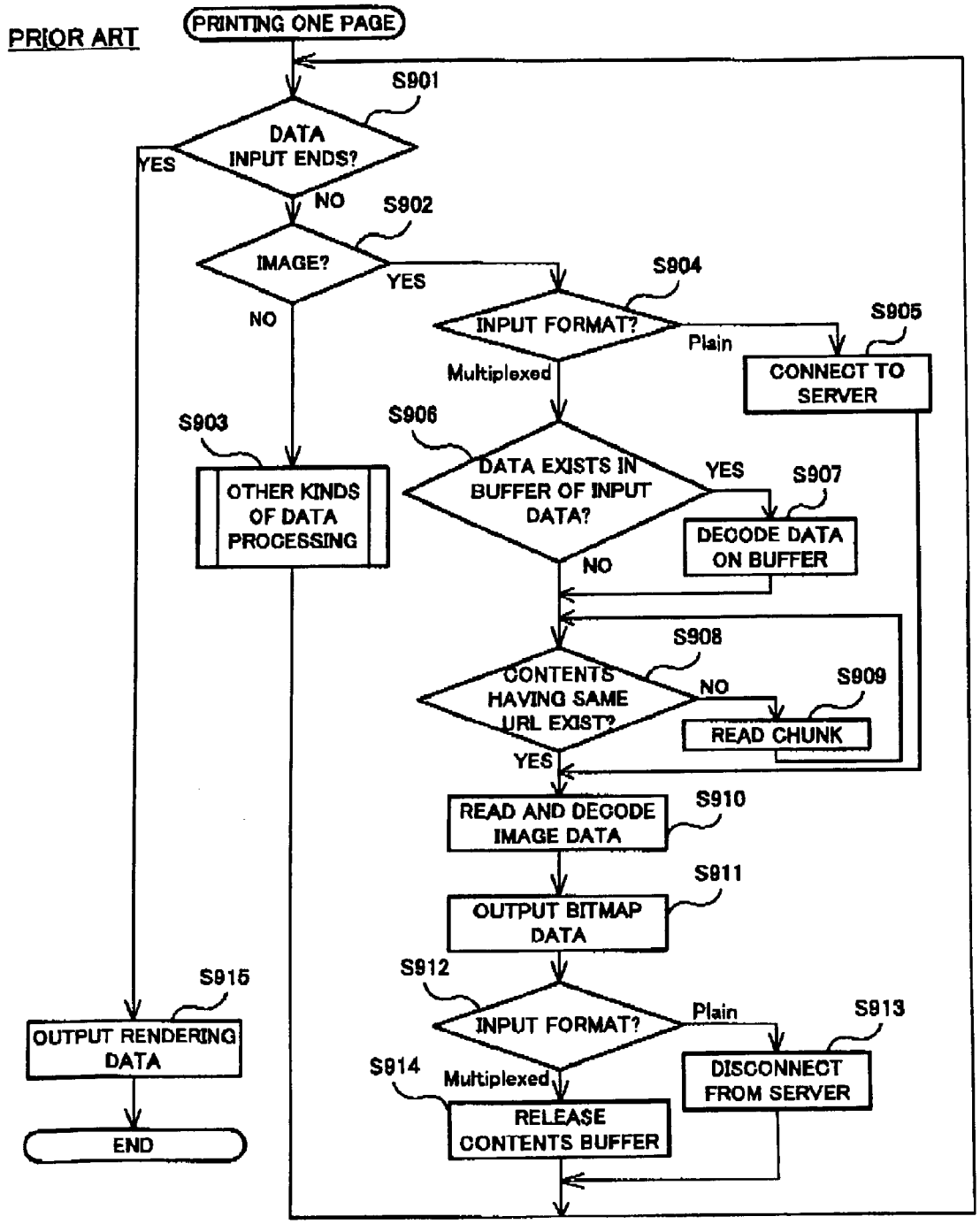
FIG. 20 is a flowchart of rendering processing in the conventional printer.

Next, a second embodiment of the present invention will be described with reference to FIG. 18. In a network system as illustrated in FIG. 18, a printer 61, a layouter 62, a renderer 63, a client 64 such as a computer, and a web server 65 are connected to one another through a network cable 66 so that any device can transmit data to and receive data from another device. The web server 65 stores therein web pages corresponding to URLs. The client 64 receives web page data from the web server 65 and outputs multiplexed data or plain XHTML to the printer 61.

The printer 61 includes therein a data control section 61a having substantially the same function as the data control section 11a included in the CPU 11 of the printer 2a of the first embodiment, a buffer 61b corresponding to the RAM 13 of the first embodiment for, e.g., storing an XHTML file and image data constituting multiplexed data, and a print engine 61c having substantially the same function as the print engine 14 of the first embodiment.

The layouter 62 has substantially the same function as the layouter 11b included in the CPU 11 of the printer 2a of the first embodiment. The renderer 63 has substantially the same function as the renderer 11c included in the CPU 11 of the printer 2a of the first embodiment. That is, in the network system of FIG. 18, the functions of the printer 2a of the first embodiment are distributed to the printer 61, the layouter 62, and the renderer 63. In this distributed construction, substantially the same processes as in FIGS. 7 to 17 of the first embodiment can be implemented.

Here, functions of the printer 61, the layouter 62, and the renderer 63 will be briefly described. The data control section 61a of the printer 61 includes therein a detector, a downloader, a retriever, and an output controller, like the first embodiment. These parts have the same functions as those of the first embodiment, respectively.

The data control section 61a judges whether data received from the client 64 is multiplexed data or plain XHTML. The data control section 61a stores multiplexed data composed of one or more chunks in the buffer 11b. When receiving a request signal for image data from the layouter 62, the data control section 61a transmits the image data to the layouter 62. When receiving a request signal for image data from the renderer 61, the data control section 61a transmits the image data to the renderer 63. At this time, in case that the input data from the client 64 is multiplexed data, the data control section 61a retrieves the image data from the buffer 61b to send the image data to the layouter 62 or renderer 63. Contrastingly in case that the input data from the client 64 is plain XHTML, the data control section 61a downloads the image data from the web server 65 using an URL, originally in the XHTML file, contained in the request signal to send the image data to the layouter 62 or renderer 63.

The layouter 62 includes therein a request signal generator, a layout section, and an output section, like the first embodiment. These sections have the same functions as those of the first embodiment, respectively.

The layouter 62 generates a request signal for image data and sends the request signal to the printer 61. The layouter 62 makes a layout of text data and image data on the basis of an XHTML file received from the data control section 61a of the printer 61 and dimensions information of the image data acquired from the printer 61, and outputs layout data having layout information to the renderer 63.

The renderer 63 includes therein a request signal generator, a rendering section, and an output section, like the first embodiment. These sections have the same functions as those of the first embodiment, respectively.

The renderer 63 generates a request signal for image data and sends the request signal to the printer 61. The renderer 63 performs rendering of text data and image data on the basis of the layout data received from the layouter 62 and the image data acquired from the printer 61, and outputs rendering data having rendering information through the data control section 61a to the print engine 61c of the printer 61.

In this embodiment, only processing in the data control section 11a of the printer 61 must be changed in accordance with which of multiplexed data and plain XHTML the input data from the client 64 is, Processing in the layouter 62 and renderer 63 need not be changed. Therefore, even if there is a change in or an addition to the input format of input data from the client 64, it suffices that only the construction of the data control section 61 of the printer 61 is changed. That is, the same layouter 62 and renderer 63 can be used even it there is a change in or an addition to the input format of input data from the client 64. Thus, the development cost can be lowered.

In a modification of the present invention, the data control section 11a does not issue a deletion request for deleting image data to a storage device that stores therein the image data and can perform processing, after the data control section 11a sends the image data in response to a request from the layouter 11b, and the data control section 11a issues a deletion request for deleting the image data to the storage device after the data control section 11a sends the image data in response to a request from the renderer 11c. In this case, the storage device may be designed so as not to delete image data until the storage device confirms a deletion request for the image data. In this measure, necessary image data can be prevented from being erroneously deleted.

In the above embodiments described is a case of inputting multiplexed data or plain XHTML. However, the present invention can be applied to a case of inputting data in another format. Further, the present invention is not limited to a case of inputting a document file in the form of XHTML. The present invention can be applied to a case of inputting a document file in another form.

Further, the present invention can take any construction if unnecessary image data can be deleted from the RAM 13 when the image data becomes unnecessary after the data control section sends the image data to the layouter or renderer in response to a request from the layouter or renderer.

Further, in the above-described embodiments, in case of plain XHTML, image data is always downloaded through a network. However, input data may be stored in a RAM or HDD in accordance with conditions of the network so that stored image data can be used to cope with a request from the layouter or renderer. In this case, even when the communication speed of the network is low, output data can rapidly be generated. Contrastingly, the contents buffer 13b is not always necessary. That is, even in case of multiplexed data, the downloader 11a2 may download image data through an external network such as the Internet to output the image data to the layouter 11b or renderer 11c.

Further, in still another modification, the layouter 11b or renderer 11c may send, to the data control section 11a, a request signal containing not the URL but the title of image data. In this case, however, when receiving plain data from the client, the printer must stores the URL of the image data in a memory such as the RAM 13. Moreover, the present invention is applicable to not only a printer but also another device having an image output unit for example a copying machine, a facsimile machine, and a multifunction peripheral MFP).

When this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image forming device comprising:
   a layouter for generating layout data for a document file on a basis of text data included in the document file and dimensions information on image data related to the document file;
   a renderer for generating rendering data for the document file on a basis of the image data related to the document file and the layout data acquired from the layouter;
   a data control section connected to the layouter and the renderer;
   a print section for printing on the basis of the rendering data received from the renderer; and
   an image storage memory for storing the image data,
   the data control section including:
      a detector for detecting location information on the image data when the data control section receives a request for the dimensions information on the image data from the layouter and for detecting the location information on the image data when the data control section receives a request for the image data from the renderer;
      an acquirer for acquiring the requested image data and the dimensions information on the image data on the basis of the location information detected by the detector; and
      an output controller for controlling so that the document file is outputted to the layouter and the image data and the dimensions information on the image data acquired by the acquirer are outputted to the renderer and the layouter, respectively,
   wherein the image forming device makes control, when the image forming device receives multiplexed data including the document file and the image data, so that the image data related to the document file is outputted to the image storage memory,
   wherein when the image forming device receives multiplexed data including the document file and the image data, the detector detects a location stored in the image storage memory as the location information on the image data, and the acquirer acquires the image data and the dimensions information on the image data stored in the image storage memory, on the basis of the location information detected by the detector, and
   wherein when the image forming device receives plain data that is a document file with no image data, the detector detects a location in a device connected to the image forming device through a network, as the location information on image data, and the acquirer acquires the image data and the dimensions information on the image data from the device on the basis of the location information detected by the detector.

2. The image forming device according to claim 1, wherein the detector detects a location in a device connected to the image forming device through a network on the basis of information included in the request received from the layouter or the renderer.

3. The image forming device according to claim 1, wherein the location information on image data is the Uniform Resource Locator of the image data, and the request includes the Uniform Resource Locator of the image data.

4. The image forming device according to claim 1, wherein the detector detects a location in the device as the location information on the image data on the basis of information included in the request received from the layouter or the renderer, when the image forming device receives the plain data that is a document file with no image data.

5. The image forming device according to claim 1, wherein the image storage memory stores therein the location information on the image data described in the document file, together with the image data, and
when the image forming device receives the multiplexed data including the document file and the image data, the detector compares the location information on the image data stored in the image storage memory with the location information received from the layouter or the renderer together with a request for the image data or the dimensions information on the image data, and thereby detects a location stored in the image storage memory as the location information on the image data.

6. The image forming device according to claim 1, wherein the output controller determines in accordance with conditions of the network as to whether or not the image data received by the data control section should be outputted to the image storage memory.

7. The image forming device according to claim 1, wherein the layouter requests the data control section to send the dimensions information on the image data, such that the image data stored in the image storage memory is not deleted after the dimensions information on the image data is read out.

8. The image forming device according to claim 1, wherein the renderer requests the data control section to send the image data, such that the image data stored in the image storage memory is deleted after the image data is read out.

9. The image forming device according to claim 1, wherein the data control section does not issue, to the image storage memory, an instruction to delete the image data, after the dimensions information on the image data is outputted to the layouter as a response to a request for the dimensions information on the image data from the layouter.

10. The image forming device according to claim 1, wherein the data control section issues, to the image storage memory, an instruction to delete the image data, after the image data is outputted to the renderer as a response to a request for the image data from the renderer.

11. The image forming device according to claim 10, wherein the image storage memory does not delete the image data until receiving a deletion instruction from the data control section.

12. An image forming device comprising:
a data control section connected to a layouter for generating layout data for a document file and a renderer for generating rendering data for the document file;
a print section for printing on a basis of the rendering data; and
an image storage memory for storing the image data,
the data control section including:
a detector for detecting location information on image data when the data control section receives a request for dimensions information on the image data from the layouter and for detecting the location information on image data when the data control section receives a request for the image data from the renderer;
an acquirer for acquiring the requested image data and the dimensions information on the image data on a basis of the location information detected by the detector; and
an output controller for controlling so that the document file is outputted to the layouter, the image data and the dimensions information on the image data acquired by the acquirer are outputted to the renderer and the layouter, respectively, and the rendering data is outputted from the renderer to the print section,
wherein the image forming device makes control, when the image forming device receives multiplexed data including the document file and the image data, so that the image data related to the document file is outputted to the image storage memory,
wherein when the image forming device receives multiplexed data including the document file and the image data, the detector detects a location stored in the image storage memory as the location information on the image data, and the acquirer acquires the image data and the dimensions information on the image data stored in the image storage memory, on the basis of the location information detected by the detector, and
wherein when the image forming device receives plain data that is a document file with no image data, the detector detects a location in a device connected to the image forming device through a network, as the location information on image data, and the acquirer acquires the image data and the dimensions information on the image data from the device on the basis of the location information detected by the detector.

13. A layouter connected to a renderer for generating rendering data for a document file and an image forming device for printing on a basis of the rendering data made by the renderer, the image forming device including a data control section and an image storage memory for storing image data, the data control section including a detector for detecting location information on the image data when the data control section receives a request for dimensions information on the image data from the layouter, an acquirer for acquiring the requested image data and the dimensions information on the image data on the basis of the location information detected by the detector, and an output controller for controlling so that the document file and the dimensions information are outputted to the layouter, wherein the image forming device makes control, when the image forming device receives multiplexed data including the document file and the image data, so that the image data related to the document file is outputted to the image storage memory, and wherein when the image forming device receives multiplexed data including the document file and the image data, the detector detects a location stored in the image storage memory as the location information on the image data, the acquirer acquires the image data and the dimensions information on the image data stored in the image storage memory, on the basis of the location information detected by the detector, and wherein when the image forming device receives plain data that is a document file with no image data, the detector detects a location in a device connected to the image forming device through a network, as the location information on image data, and the acquirer acquires the image data and the dimensions information on the image data from the device on the basis of the location information detected by the detector, the layouter comprising:
a request signal generator for generating a request signal for requesting the data controller to send the dimensions information on image data related to a document file received from the output controller;
a layout section for generating layout data for the document file on a basis of the dimensions information on the image data received from the output controller as a response to the request signal, and the document file received from the output controller, and
an output section for outputting the layout data generated by the layout section to the renderer.

14. A renderer connected to a layouter for generating layout data for a document file and an image forming device for printing on a basis of rendering data, the image forming device including a data control section and an image storage memory for storing image data, the data control section including a detector for detecting location information on the image data when the data control section receives a request for the image data from the renderer, an acquirer for acquiring the requested image data on the image data on the basis of the location information detected by the detector, and an output controller for controlling so that the image data acquired by the acquirer is outputted to the renderer, wherein the image forming device makes control, when the image forming device receives multiplexed data including the document file and the image data, so that the image data related to the document file is outputted to the image storage memory, and wherein when the image forming device receives multiplexed data including the document file and the image data, the detector detects a location stored in the image storage memory as the location information on the image data, the acquirer acquires the image data and the dimensions information on the image data stored in the image storage memory, on the basis of the location information detected by the detector, and wherein when the image forming device receives plain data that is a document file with no image data, the detector detects a location in a device connected to the image forming device through a network, as the location information on image data, and the acquirer acquires the image data and the dimensions information on the image data from the device on the basis of the location information detected by the detector, the renderer comprising:

a request signal generator for generating a request signal for requesting the data controller to send the image data related to the layout data received from the layouter;

a rendering section for generating rendering data for the document file on a basis of the image data received from the output controller as a response to the request signal, and the layout data received from the layouter; and an output section for outputting the rendering data generated by the rendering section to the image forming device.

* * * * *